United States Patent
Hamad

(10) Patent No.: US 9,180,401 B2
(45) Date of Patent: Nov. 10, 2015

(54) LIQUID, SLURRY AND FLOWABLE POWDER ADSORPTION/ABSORPTION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

(75) Inventor: Esam Zaki Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 22 days.

(21) Appl. No.: 13/980,453

(22) PCT Filed: Jan. 20, 2012

(86) PCT No.: PCT/US2012/022034
§ 371 (c)(1),
(2), (4) Date: Jul. 18, 2013

(87) PCT Pub. No.: WO2012/100165
PCT Pub. Date: Jul. 26, 2012

(65) Prior Publication Data
US 2013/0298761 A1     Nov. 14, 2013

Related U.S. Application Data

(60) Provisional application No. 61/434,659, filed on Jan. 20, 2011.

(51) Int. Cl.
*B01D 53/14* (2006.01)
*F01N 3/04* (2006.01)
(Continued)

(52) U.S. Cl.
CPC ............ *B01D 53/1425* (2013.01); *B01D 53/92* (2013.01); *F01N 3/02* (2013.01);
(Continued)

(58) Field of Classification Search
CPC .................. B01D 2257/504; B01D 2259/4566; B01D 53/1425; B01D 53/1475; B01D 53/92; F01N 2240/02; F01N 2240/26; F01N 2570/10; F01N 3/04; Y02C 10/06; Y02T 10/20
See application file for complete search history.

(56) References Cited

U.S. PATENT DOCUMENTS 3,658,043 A    4/1972   Hoffman
3,828,552 A    8/1974   Nishiguchi
(Continued)

FOREIGN PATENT DOCUMENTS

CN     201196111 Y    2/2009
DE     3437750 A1    5/1986
(Continued)

OTHER PUBLICATIONS

Dubey et al. "Extraction of carbon dioxide from the atmosphere through engineered chemical sinkage" Fuel Chemistry Division Preprints 2002.*

(Continued)

*Primary Examiner* — Christopher P Jones
(74) *Attorney, Agent, or Firm* — Abelman, Frayne & Schwab

(57) ABSTRACT

A method and system are described for on-board treatment of an exhaust stream containing $CO_2$ emitted by a hydrocarbon-fueled internal combustion engine (ICE) used to power a vehicle in order to reduce the amount of $CO_2$ discharged into the atmosphere which include:

a. a treatment zone on board the vehicle containing a capture agent that is a liquid, a slurry or a finely divided flowable solid having a predetermined capacity for extracting $CO_2$ from the exhaust stream, the treatment zone having an inlet for admitting the exhaust gas stream and an outlet for passage of a treated exhaust stream to contact the capture agent having a reduced $CO_2$ content, the treatment zone including a heat exchanger with an inlet for receiving the hot exhaust gas stream from the ICE for passage in heat exchange relation with the capture agent to release $CO_2$ and regenerate the capture agent, and an outlet for the cooled exhaust gas stream, the treatment zone having a $CO_2$ discharge outlet for $CO_2$ released from the regenerated capture agent;

b. a compression zone in fluid communication with the $CO_2$ discharge outlet from the treatment zone, the compression zone including one or more compressors for reducing the volume of the $CO_2$;

c. a storage zone for receiving the compressed $CO_2$ for temporary storage on board the vehicle;

d. an exhaust gas conduit in fluid communication with the treated exhaust gas stream outlet from the treatment zone; and e. at least one waste heat recovery zone for recovery of heat energy from the exhaust gas stream, the ICE cooling system and/or directly from the ICE for conversion to electrical or mechanical energy.

19 Claims, 12 Drawing Sheets

(51) Int. Cl.
  *F01N 3/02* (2006.01)
  *B01D 53/92* (2006.01)
(52) U.S. Cl.
  CPC .............. *F01N 3/04* (2013.01); *B01D 53/1475* (2013.01); *B01D 2257/504* (2013.01); *B01D 2259/4566* (2013.01); *F01N 2240/02* (2013.01); *F01N 2240/26* (2013.01); *F01N 2570/10* (2013.01); *Y02T 10/20* (2013.01)

(56) References Cited

U.S. PATENT DOCUMENTS

| | | |
|---|---|---|
| 3,909,206 A | 9/1975 | Katz |
| 3,913,326 A | 10/1975 | Banks |
| 3,932,987 A | 1/1976 | Munzinger |
| 4,055,955 A | 11/1977 | Johnson |
| 4,290,268 A | 9/1981 | Lowther |
| 4,341,088 A | 7/1982 | Mei et al. |
| 4,674,463 A | 6/1987 | Duckworth et al. |
| 4,729,879 A | 3/1988 | Black |
| 4,786,294 A | 11/1988 | Jonqueres et al. |
| 4,810,266 A | 3/1989 | Zinnen |
| 4,891,939 A | 1/1990 | Brighenti |
| 4,899,544 A | 2/1990 | Boyd |
| 5,076,055 A | 12/1991 | Jubb |
| 5,100,635 A | 3/1992 | Krishnamurthy et al. |
| 5,141,620 A | 8/1992 | Molter |
| 5,233,837 A | 8/1993 | Callahan |
| 5,272,891 A | 12/1993 | Erickson |
| 5,281,254 A | 1/1994 | Birbara et al. |
| 5,442,914 A | 8/1995 | Otsuka |
| 5,467,722 A | 11/1995 | Meratla |
| 5,515,691 A | 5/1996 | Wertenbach et al. |
| 5,667,561 A | 9/1997 | Suzuki et al. |
| 5,680,764 A | 10/1997 | Viteri |
| 5,743,080 A | 4/1998 | Ginter |
| 5,857,324 A | 1/1999 | Scappatura et al. |
| 5,876,488 A | 3/1999 | Birbara et al. |
| 6,079,373 A | 6/2000 | Kawamura |
| 6,218,173 B1 | 4/2001 | Naito |
| 6,220,019 B1 | 4/2001 | Sugiura et al. |
| 6,263,659 B1 | 7/2001 | Dillon et al. |
| 6,301,927 B1 | 10/2001 | Reddy |
| 6,352,576 B1 | 3/2002 | Spencer et al. |
| 6,374,630 B1 | 4/2002 | Jones |
| 6,387,337 B1 | 5/2002 | Pennline et al. |
| 6,582,498 B1 | 6/2003 | Sass et al. |
| 6,591,614 B2 | 7/2003 | Smith et al. |
| 6,598,398 B2 | 7/2003 | Viteri et al. |
| 6,625,977 B2 | 9/2003 | Lehman |
| 6,655,150 B1 | 12/2003 | Åsen et al. |
| 6,675,609 B2 | 1/2004 | Takeuchi et al. |
| 6,712,879 B2 | 3/2004 | Kato et al. |
| 6,764,530 B2 | 7/2004 | Iijima |
| 6,866,702 B2 | 3/2005 | Mitsuda |
| 6,889,512 B2 | 5/2005 | Ebara et al. |
| 6,890,497 B2 | 5/2005 | Rau et al. |
| 6,912,872 B2 | 7/2005 | Whitlock |
| 6,925,821 B2 | 8/2005 | Sienel |
| 7,055,333 B2 | 6/2006 | Leitch et al. |
| 7,065,962 B2 | 6/2006 | Boncodin |
| 7,067,456 B2 | 6/2006 | Fan et al. |
| 7,073,348 B2 | 7/2006 | Clodic et al. |
| 7,089,743 B2 | 8/2006 | Frutschi et al. |
| 7,207,170 B2 | 4/2007 | Fukuma |
| 7,250,150 B1 | 7/2007 | Keefer et al. |
| 7,266,940 B2 | 9/2007 | Balan et al. |
| 7,275,395 B1 | 10/2007 | Ventura |
| 7,290,504 B2 | 11/2007 | Lange |
| 7,326,280 B2 | 2/2008 | Hrycak et al. |
| 7,390,444 B2 | 6/2008 | Ramme et al. |
| 7,444,812 B2 | 11/2008 | Kirkpatirck et al. |
| 7,618,606 B2 | 11/2009 | Fan et al. |
| 7,621,980 B2 | 11/2009 | Saito et al. |
| 2003/0053942 A1 | 3/2003 | Fernandez |
| 2004/0074235 A1 | 4/2004 | Lampkin et al. |
| 2004/0128975 A1 | 7/2004 | Viteri |
| 2004/0187486 A1 | 9/2004 | Ieda |
| 2005/0115230 A1 | 6/2005 | Shi |
| 2005/0172631 A1 | 8/2005 | Primlani |
| 2005/0193962 A1 | 9/2005 | Munoz |
| 2006/0039853 A1 | 2/2006 | Fan et al. |
| 2006/0150665 A1 | 7/2006 | Weimer et al. |
| 2006/0204425 A1 | 9/2006 | Kamijo et al. |
| 2007/0149398 A1 | 6/2007 | Jones et al. |
| 2007/0193254 A1 | 8/2007 | Johannes |
| 2007/0243127 A1 | 10/2007 | Fedorov et al. |
| 2008/0010967 A1 | 1/2008 | Griffin et al. |
| 2008/0056972 A1 | 3/2008 | Iijima |
| 2008/0112868 A1 | 5/2008 | Blencoe et al. |
| 2008/0127632 A1 | 6/2008 | Finkenrath et al. |
| 2008/0134660 A1 | 6/2008 | Finkenrath et al. |
| 2008/0202339 A1 | 8/2008 | Nalette et al. |
| 2008/0236117 A1 | 10/2008 | Zhang et al. |
| 2008/0302104 A1 | 12/2008 | Hwang |
| 2009/0019861 A1 | 1/2009 | Heckt et al. |
| 2009/0038561 A1 | 2/2009 | Hago et al. |
| 2009/0169452 A1 | 7/2009 | Constantz et al. |
| 2009/0173073 A1 | 7/2009 | Guidati et al. |
| 2009/0178387 A1 | 7/2009 | Schultz et al. |
| 2009/0183697 A1 | 7/2009 | Inui |
| 2009/0263296 A1 | 10/2009 | Taques |
| 2009/0263316 A1 | 10/2009 | Iyer et al. |
| 2009/0275120 A1 | 11/2009 | Koch et al. |
| 2009/0282389 A1 | 11/2009 | Slone et al. |
| 2009/0305388 A1* | 12/2009 | Dressler et al. ............ 435/257.1 |
| 2009/0313997 A1 | 12/2009 | Bayley et al. |
| 2009/0315489 A1 | 12/2009 | Karim et al. |
| 2010/0024651 A1 | 2/2010 | Bansal |
| 2010/0071559 A1 | 3/2010 | Miachon et al. |
| 2010/0158776 A1 | 6/2010 | Drnevich et al. |
| 2010/0172810 A1 | 7/2010 | Yi et al. |
| 2011/0167798 A1 | 7/2011 | Evans-Beauchamp |

FOREIGN PATENT DOCUMENTS

| | | |
|---|---|---|
| DE | 4140573 A1 | 6/1993 |
| EP | 1992799 A2 | 11/2008 |
| FR | 2875265 A1 | 3/2006 |
| JP | 2006298707 A | 11/2006 |
| WO | 03/029625 A1 | 4/2003 |

OTHER PUBLICATIONS

Dubey et al., "Extraction of Carbon Dioxide From the Atmosphere Through Engineered Chemical Sinkage", Fuel Chem. Div. Preprints, 2002, 47(1), pp. 81-84.

International Search Report & Written Opinion mailed on May 21, 2012 in PCT/US2012/022008 filed Jan. 20, 2012.

Supplementary European Search Report & Opinion mailed Oct. 31, 2014 in EP 12736166 filed Jan. 21, 2012.

Office Action mailed Jul. 9, 2014 in U.S. Appl. No. 13/980,620, filed Aug. 29, 2013.

International Search Report & Written Opinion mailed May 25, 2012 in PCT/US2012/022058 filed Jan. 20, 2012.

Supplementary European Search Report & Opinion mailed Oct. 21, 2014 in EP12736182 filed Jan. 20, 2012.

International Search Report & Written Opinion mailed May 10, 2012 in PCT/US2012/022034 filed Jan. 20, 2012.

Supplementary European Search Report & Opinion mailed Jul. 23, 2014 in EP 12736347 filed Jan. 20, 2012.

Office Action mailed Oct. 3, 2014 in U.S. Appl. No. 13/980,596, filed Aug. 29, 2013.

International Search Report & Written Opinion mailed May 8, 2012 in PCT/US2012/022021 filed Jan. 20, 2012.

* cited by examiner

Prior Art

LIQUID, SLURRY AND FLOWABLE POWDER ADSORPTION/ABSORPTION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

FIELD OF THE INVENTION

The invention relates to the reduction of carbon dioxide emissions from the exhaust gas stream of vehicles powered by internal combustion engines and other heat engines that produce waste heat.

BACKGROUND OF THE INVENTION

The currently accepted thinking is that global warming is due to emissions of greenhouse gases such as carbon dioxide ($CO_2$) and methane ($CH_4$). About a quarter of global human-originated $CO_2$ emissions are currently estimated to come from mobile sources, i.e., automobiles, trucks, buses and trains that are powered by internal combustion engines (ICES). This proportional contribution is likely to grow rapidly in the foreseeable future with the projected surge in automobile and truck ownership in developing countries. At present, the transportation sector is a major market for crude oil, and controlling $CO_2$ emissions is both an environmental responsibility and a desirable goal in order to maintain the viability of the crude oil market in the transportation sector in the face of challenges from alternative technologies, e.g., cars powered by electric motors and storage batteries.

Carbon dioxide management from mobile sources presents many challenges including space and weight limitations, the lack of any economies of scale and the dynamic nature of the operation of the ICEs powering the mobile sources.

Prior art methods for the capture of $CO_2$ from combustion gases have principally focused on stationary sources, such as power plants. Those that address the problem of reducing $CO_2$ emissions from mobile sources employ either combustion using oxygen, provide no means for the regeneration and reuse of the $CO_2$ capture agent, and/or make no use of waste heat recovered from the hot source. Combustion using oxygen requires an oxygen-nitrogen separation step which is more energy-intensive than separating $CO_2$ from the exhaust gases and would be more difficult if attempted on board the vehicle.

The focus of $CO_2$ capture technology has been on stationary or fixed sources. Processes have been developed that use amines and amine functionalized liquids and solutions to absorb $CO_2$ at temperatures ranging from ambient up to about 80° C. At temperatures above 100° C., and particularly in the range of from about 130° C. to 300° C. that are encountered in vehicles powered by an ICE, the amines exhibit low capacity for $CO_2$ adsorption. Thus, the high temperature of the ICE exhaust gas makes direct treatment to remove $CO_2$ with liquid amine solutions impractical.

The capture of $CO_2$ from mobile sources has generally been considered too expensive, since it involves a distributed system with a reverse economy of scale. The solution to the problem has appeared to be impractical due to on-board vehicle space limitations, the additional energy and apparatus requirements and the dynamic nature of the vehicle's operating cycle, e.g., intermittent periods of rapid acceleration and deceleration.

It is therefore an object of the present invention to provide a method, a system and an apparatus which address the problems of efficiently and cost-effectively reducing the $CO_2$ emissions from vehicles by temporary on-board storage of the $CO_2$. The capability for mass production of such systems will at least partially off-set other costs associated with the distributed nature of these mobile sources.

As used herein, the term "internal combustion engine," or ICE, includes heat engines in which a carbon-containing fuel is burned to produce power or work and generates waste heat that must be removed or dissipated.

As used herein, the term "mobile source" means any of the wide variety of known conveyances that can be used to transport goods and/or people that are powered by one or more internal combustion engines that produce an exhaust gas stream containing $CO_2$. This includes all types of motor vehicles that travel on land, as well as trains and ships where the exhaust from the ICE is discharged into a containing conduit before it is discharged into the atmosphere.

The term "vehicle" as used herein is to be understood to be as a convenient shorthand and synonymous with "mobile source" and is coextensive with "conveyances", generally, as that term is used above.

As used herein, the terms "$CO_2$ capture agent" and "capture agent" mean an absorbent liquid or a finely divided solid adsorbent material or composition, e.g., a flowable solid adsorbent in powdered form, that has a predictable capacity to absorb or adsorb $CO_2$ reversibly over a significant number of absorption/adsorption and desorption cycles. The powdered solid adsorbent has the ability under appropriate conditions, to be pumped and otherwise transported as if it were a fluid. A flowable solid adsorbent material can be transported by any means known in the art, such as mechanical screw conveyors, pneumatic means, and the like. The terms also mean a flowable slurry of a solid adsorbent material in a liquid, where the liquid optionally is also capable of absorbing $CO_2$ upon contact, or where the slurry forms a new compound, e.g., a hydrate.

As used herein, the term "waste heat" is the heat that a typical engine produces which is contained mainly in the hot exhaust gases (~300° C.-650° C.) and the hot coolant (~90° C.-120° C.). Additional heat is emitted and lost by convection and radiation from the engine block and its associated components, and other components through which the exhaust gas passes, including the manifold, pipes, catalytic converter and muffler. This heat energy totals about 60% of the energy that typical hydrocarbon (HC) fuels provide.

SUMMARY OF THE INVENTION

The invention broadly comprehends a method and system for on-board treatment of a $CO_2$-containing exhaust stream emitted by a hydrocarbon-fueled internal combustion engine (ICE) used to power the vehicle in order to reduce the amount of $CO_2$ discharged into the atmosphere that includes:

a. a treatment zone on board the vehicle containing a capture agent having a predetermined capacity for extracting $CO_2$ from the exhaust stream, the treatment zone having an inlet for admitting the exhaust gas stream to contact the capture agent and an outlet for passage of a treated exhaust stream having a reduced $CO_2$ content, the treatment zone further including a heat exchanger with an inlet for receiving a hot heat exchange fluid, e.g., the hot exhaust gas stream from the ICE for passage in heat exchange relation with the capture agent to release $CO_2$ and regenerate the capture agent, and an outlet for the cooled heat exchange fluid, e.g., the exhaust gas stream, the treatment zone having a $CO_2$ discharge outlet for $CO_2$ released from the regenerated capture agent;

b. a compression zone in fluid communication with the $CO_2$ discharge outlet from the treatment zone, the compression zone including one or more compressors for reducing the volume of the $CO_2$;

c. a storage zone for receiving the compressed $CO_2$ for temporary storage on board the vehicle;

d. an exhaust gas conduit in fluid communication with the treated exhaust gas stream outlet from the treatment zone; and e. optionally, at least one waste heat recovery zone for recovery of heat energy from the exhaust gas stream, the ICE and/or directly from the ICE for conversion to electrical or mechanical energy.

The method and system of the present invention comprehends the absorption or adsorption of $CO_2$ from the exhaust gas stream of an ICE on board the vehicle using a liquid absorbent, or a flowable powdered adsorbent, or a slurry having both properties, respectively, as the $CO_2$ capture agent. In a preferred embodiment, the absorption is reversible, e.g., as by increasing the temperature and/or reducing the pressure to cause the absorbed/adsorbed $CO_2$ to be released and the absorbent/adsorbent material to be regenerated for further use.

For convenience in further describing the invention, reference will be made to the liquid absorbent and liquid absorption process, with the understanding that the description is equally applicable to the flowable powdered adsorbent and adsorption process, and also to the process employing a slurry which can optionally include both adsorption by the solid and absorption by the liquid components, as well as the formation of a hydrate compound, e.g., a clathrate hydrate.

The present invention solves the problems of space limitations and auxiliary power requirements by using the free energy that is available on board the vehicle as waste heat to capture $CO_2$ and increase its density for temporary storage until refueling. The invention consists of (a) an absorption separation method that utilizes a capture agent to remove all or a substantial portion of the $CO_2$ from the engine exhaust gases; (b) recovery of substantially pure $CO_2$ and regeneration of the capture agent using some of the engine waste heat and, optionally, (c) the conversion of some of the engine's waste heat into power, i.e., work energy; and (d) the use of this power to increase the density of the captured $CO_2$ for temporary on-board storage. The use of the waste heat to provide the energy for capture, regeneration and densification significantly reduces the capture cost and the densification will reduce the volume requirement for temporary on-board storage of the $CO_2$. Converting the waste heat into electrical or other useable forms of energy also reduces the amount of fuel that is allocated to the densification step, and thereby the overall amount of $CO_2$ in the exhaust stream associated with the power output or work done by the ICE.

The invention further comprehends the optional use of some portion of the engine's work to operate a $CO_2$ compressor. The engine's work could be utilized when the engine is operating in its deceleration mode and serves to slow the engine, and when the engine is idling. An on-board processor and controller can be utilized to engage the compressor drive link to the engine at appropriate predetermined engine operating conditions.

The invention can be used on a wide range of mobile sources such as passenger vehicles, trucks, buses, heavy-duty vehicles, train, ships and the like that operate through the combustion of fossil-based, or hydrocarbon fuels. The system and apparatus of the invention can be installed on new mobile sources and/or by retrofitting existing mobile sources.

The present invention is based on the integration of various components to form a system for efficient post-combustion $CO_2$ capture, densification and subsequent temporary storage on board the conveyance using waste heat recovered from the vehicle's ICE. The system can include (a) a treatment zone for absorption/separation for the capture of $CO_2$ from the engine exhaust gas; (b) a regeneration zone for the release of $CO_2$ from the capture agent that uses some of the engine waste heat; (c) a conversion zone where some of the waste heat is converted into power (work energy); and (d) a densification zone where power derived from the waste heat is employed to increase the density of the captured $CO_2$, and a storage zone for the temporary on-board storage. In the practice of the method of the invention, all or a substantial portion of the energy requirements to operate the system come from the waste heat of the ICE.

The waste heat that a typical engine produces consists mainly of hot exhaust gases (~300° C. to 650° C.) and hot coolant (~90° C. to 120° C.). As shown in the diagram of FIG. 1, this heat energy totals about 60% of the energy that typical hydrocarbon (HC) fuels produce upon combustion in an ICE. Energy is needed to separate the $CO_2$ from the exhaust gases and to compress, liquefy or freeze all or part of the captured $CO_2$ for efficient on-board storage. This energy is typically a mix of work and heat energies. The work component of the energy is generated by using part of the waste heat to produce this work. Some waste heat can be used to regenerate any material used in the $CO_2$ separation such as absorbent or a solid carbonate that is formed as a reaction product.

The $CO_2$ separation from the exhaust gas takes place by one or more of the reversible processes of physical absorption, chemical absorption, and/or a chemical reaction to form carbonates or other compounds. These mechanisms are well known in the field, and some are shown schematically in FIGS. 2 and 3. As illustrated in FIG. 2, about 60% of the energy value of the fuel is converted to waste heat, portions of which can be used to desorb the $CO_2$ and regenerate the capture agent and to generate electrical energy and other forms of power, or work required to compress the $CO_2$. FIG. 3 illustrates one example of the use of the heat of the exhaust gas to desorb the $CO_2$ and regenerate the capture agent. Water is also removed as condensate from the cooled exhaust gases and the exhaust gases of reduced $CO_2$ content can be discharged into the atmosphere.

In one embodiment, the temperature of all or a predetermined portion of the exhaust stream is first reduced by heat exchange in order to optimize the adsorption of the $CO_2$. The heat exchange is accomplished with an appropriate device using water or other liquid, or an ambient air cooler, or a combination of both. A predetermined portion of the cooled exhaust stream is diverted for $CO_2$ capture by contact with a known liquid amine and/or functionalized amine solution. The volumetric flow of the exhaust gas that can effectively be treated to remove or reduce the $CO_2$ present is predetermined based upon the type and characteristics of the heat exchanger and of the cooling fluid(s) used. For example, in geographic regions when the ambient air temperatures are relatively lower due to altitude, seasonal change, rapid nighttime cooling and the like, a larger volumetric proportion of the exhaust gas stream can be treated. The untreated balance of exhaust gas stream, if any, is discharged into the atmosphere. It is preferred to optimize the operation of the liquid amine capture system in order to minimize the size of the apparatus and the volume of liquid in order to save on the capital and any replacement costs, and to minimize the weight added to the vehicle by the system. The cooling capacity of the heat exchanger can be determined based on known average ambient conditions for the geographical region in which the vehicle will be used.

Assuming seasonal variations of ambient temperatures, the system can be programmed using well known and commercially available engine-control process/controllers to admit a greater proportion of the exhaust gas stream to the heat exchanger, e.g., in the winter when air temperatures are lower and a smaller proportion in the summer when temperatures rise. The volumetric flow can be controlled by an exhaust stream diverter control valve. The valve controller can be programmed to respond to temperature data from one or more of ambient air sensors, the exhaust gas stream, the outlet temperature of the heat exchanger cooler(s) and/or the temperature of the liquid in the absorber. Thus, the control strategy for the automation of the determination of the fraction of the exhaust gas stream diverted for cooling and $CO_2$ absorption versus the fraction vented to the atmosphere is based on maximizing the amount of $CO_2$ removed and densified. The exhaust diverter valve can be programmed to discharge all or substantially all of the exhaust gases to the environment under engine operating conditions of rapid acceleration, heavy load, sudden braking, or the like, where a steady-state condition is temporarily interrupted and the temperature, pressure and other sensor signals can not be reliably processed by the engine control unit or other programmed controller to optimize $CO_2$ capture for densification in real time.

The specific use in the limited space that can be made available on board mobile sources requires close analysis of many parameters. Regeneration of the capture agent will preferably take place on board by a temperature swing or pressure swing process. However, in the event that the capture agent possesses a very high capacity that serves both to capture and to densify the $CO_2$, the regeneration can be completed during refueling or at a fixed station. The absorbent material can be maintained in a cartridge or other removable container that can be removed for regeneration at an appropriate facility. Multiple cartridges can be installed in parallel for extended vehicle operation.

The regeneration and densification steps can also proceed simultaneously. If a capture agent is heated, it will begin releasing $CO_2$. If $CO_2$ is not removed or given expansion space, then high pressure and high temperature $CO_2$ will accumulate. In this case, the regeneration of the capture agent will not be as complete as when the $CO_2$ released is removed. However, the same dynamic capacity of the liquid can be maintained by increasing the regeneration temperature.

In a preferred embodiment, the $CO_2$ released from the capture agent in an apparatus that will create a positive pressure and the intake of the $CO_2$ compressor will produce a down-stream low pressure zone, thereby resulting in the flow of the desorbed $CO_2$ gas stream for compression. Withdrawal of the $CO_2$ during desorption can also be facilitated by a vacuum pump downstream of the $CO_2$ compressor. When a predetermined amount of the $CO_2$ has been desorbed, the absorption unit can be returned to service to receive the engine exhaust stream. In a preferred mode of operation, the liquid or flowable solid sorbent is circulated through the adsorption zone and desorption zone, which is in contrast to the batch operation, e.g., as in thermal swing using solid sorbents.

The formation of dense $CO_2$ for efficient on-board temporary storage is accomplished by compression, liquefaction, or by freezing the gas to form solid $CO_2$, i.e., dry ice. The final density of the $CO_2$ will be in the range of from 5-1600 kg/m³, depending upon its state, i.e., gas, liquid and/or solid. At least a part of the total work energy required for the densification is obtained from the waste heat by using heat-to-power conversion.

During start-up of the $CO_2$ capture cycle, or to meet a requirement of other special operational needs, part of the engine's power or, alternatively, the electricity stored in on-board batteries can be used. During the normal steady-state operation of the system, at least a portion of the energy required for $CO_2$ capture and densification will come from the ICE's waste heat.

One advantage possessed by the present invention over prior art processes for reducing $CO_2$ emissions from fixed sources is the ready availability of relatively high to moderate temperature waste heat. The cost of the heat energy is a major item of expense for $CO_2$ capture from fixed sources because the temperature of the flue gases from a coal- or gas-fired electrical generation facility has been reduced in order to maximize the energy values of the fuel and also minimize the discharge of pollutants such $SO_x$ of waste heat into the environment.

BRIEF DESCRIPTION OF THE DRAWINGS

The invention will be further described below and with reference to the attached drawings in which the same or similar elements are identified by the same number, and in which.

DETAILED DESCRIPTION OF THE INVENTION

The invention will be described with reference to embodiments in which $CO_2$ is extracted from the engine's exhaust gas until the capacity of the capture agent is reached and then the $CO_2$ is desorbed and recovered from the capture agent, which is simultaneously regenerated. The $CO_2$ that is recovered as a gas stream is then compressed for storage as a gas, liquid and/or solid. Some or all of the energy required for some or all of the steps is derived from waste heat recovered from the engine exhaust stream, which can be used directly for regeneration of the capture agent and/or converted to electricity or work by other conventional devices. Waste heat energy can also be derived from the coolant system and/or the engine block and associated parts.

Figure 1:
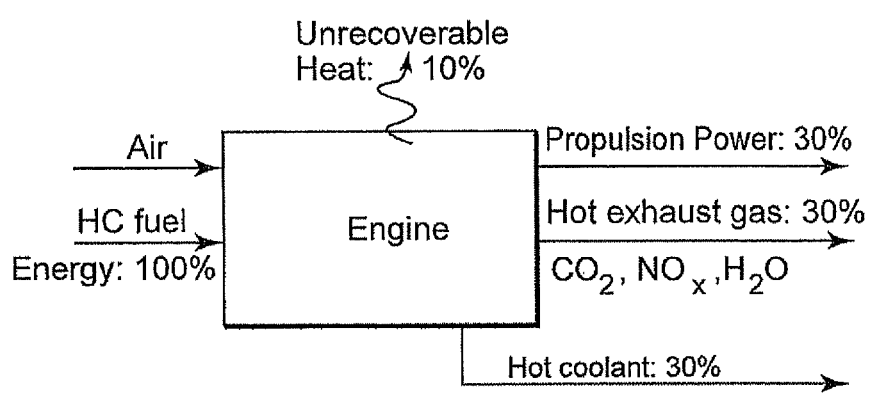
FIG. 1 is a schematic illustration of the conversion of hydrocarbon fuel energy to heat and power, or work, by a typical internal combustion engine.
Figure 2:
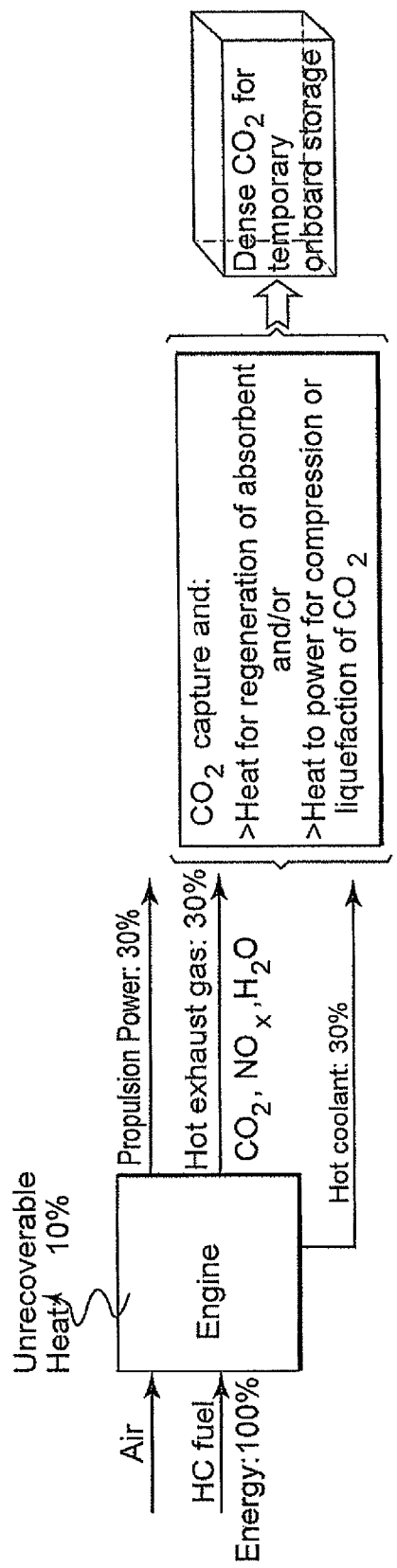
FIG. 2 is a schematic illustration that incorporates FIG. 1 and the method of the present invention.
Figure 3:
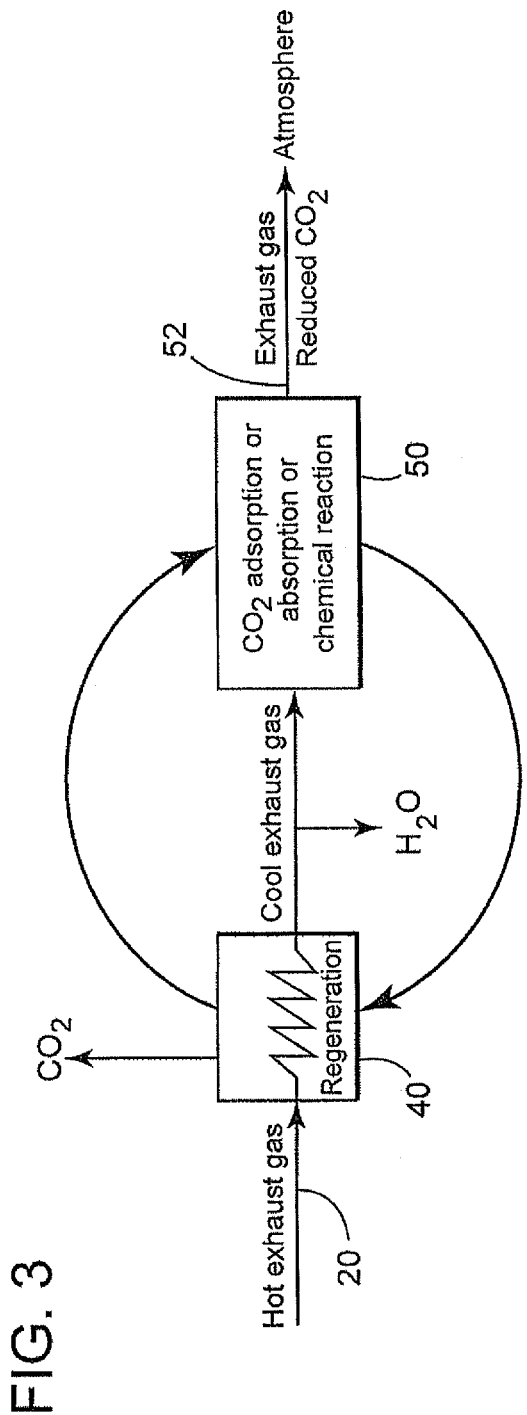
FIG. 3 is a schematic illustration of an embodiment of the method of the present invention using waste heat from the ICE to regenerate the capture agent.

In one embodiment of this invention schematically illustrated in FIG. 3, a suitable system and apparatus is shown in which the $CO_2$ is absorbed from the exhaust gas stream 20 after the exhaust passes through the sorbent regeneration zone 40 in heat exchange relation with the $CO_2$-rich sorbent. The system is illustratively shown with two subsystems, or cells 40 ("regeneration zone") and 50 ("$CO_2$ absorption zone"); however, additional subsystems can be used based on the capacity of the capture agent, exhaust gas flow rates and other characteristics of the system. Each subsystem can be similar in design, including a heat exchanger to raise the temperature of the liquid absorbent to desorb the $CO_2$, and each subsystem can be arranged in parallel, or in series in order to recover a greater proportion of $CO_2$.

Figure 4:
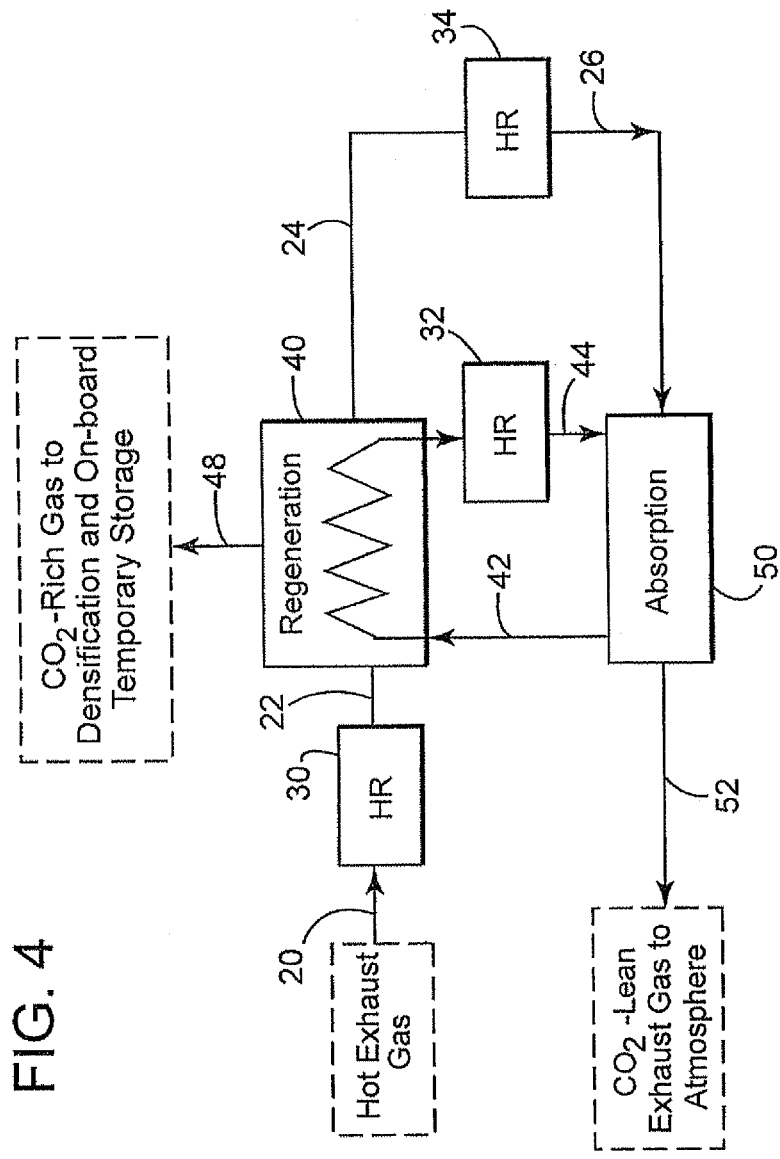
FIG. 4 is a schematic illustration of one embodiment of a system and apparatus employing a liquid capture agent and representative heat recovery devices.
Figure 5:
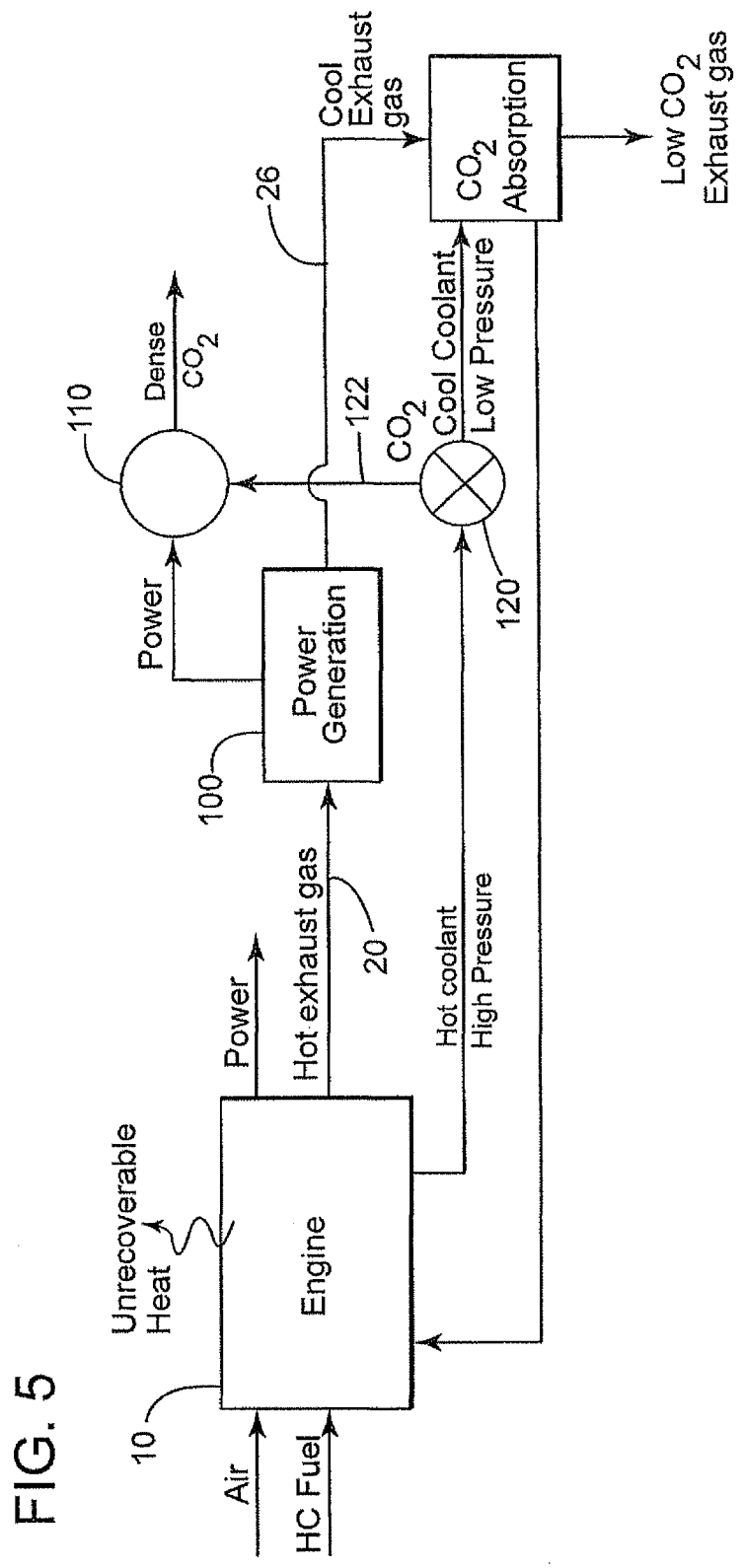
FIG. 5 is a schematic illustration of another embodiment in which an absorbing engine coolant is utilized as the capture agent.

Representative embodiments of the invention are schematically illustrated in FIGS. 4 and 5. An overview of an absorption process is shown in FIG. 4. The hot exhaust gas stream 20 passes though heat recovery (HR) unit 30 that operates at temperatures in the range of from 300° C.-650° C. to convert some of the waste heat into electrical or mechanical energy. The cooled exhaust gas stream then passes to a heat exchanger in the regeneration unit 40 where it provides low temperature heat that is needed to desorb the $CO_2$ and thereby regenerate the liquid absorbent 42 that is saturated with $CO_2$.

The further cooled exhaust gas stream is then passed to another heat recovery unit 32 that operates at a lower temperature than HR 30 where additional waste heat is converted into electrical or mechanical energy. The further cooled exhaust gas stream 26 is then passed to the absorption unit 50 where it contacts the regenerated liquid 44 which absorbs or captures the $CO_2$. This liquid absorbent 44 from the regeneration unit 40 passes through a heat recovery unit 32 that lowers its temperature to the desired value for optimum absorption capacity, and the heat recovered is converted to additional electrical or mechanical energy. The treated exhaust gas stream 52 having a reduced $CO_2$ content is discharged into the atmosphere.

Another embodiment of this invention is schematically illustrated in FIG. 5 in which the ICE's conventional coolant is replaced by a liquid mixture that functions not only to cool the ICE, but also to absorb $CO_2$ from the exhaust gas stream. This specialized coolant is referred to below as an "absorbing coolant". In the engine, the hydrocarbon fuel and air are combusted to produce energy and exhaust gases including $CO_2$. The capacity for $CO_2$ absorption at high temperatures from the hot exhaust gases is very limited. To cool down these gases and at the same time provide power or work energy for later $CO_2$ densification, the hot exhaust gas stream is passed through a heat-to-power converter 100, such as a thermoelectric devices or steam-generator-turbine combination. The power from converter 100 can be used to density the $CO_2$, e.g., via compressor 110.

The cooled exhaust gas stream 26 containing $CO_2$ is contacted with the cool absorbing coolant which absorbs most of the $CO_2$, and the remaining exhaust gases reduced in $CO_2$ content are discharged into the atmosphere. The cool absorbing coolant is now sent to the engine block where it is heated by the combustion of the fuel in the cylinders. The hot absorbing coolant has less capacity for $CO_2$ and as soon as the pressure is reduced, most of the $CO_2$ is released as gas and is separated from the liquid coolant in separator 120. The absorbing coolant is then recycled and the process continues. The properties of the absorbing coolant are determined based on the operating conditions of temperature and pressure in order to optimize its $CO_2$ absorption capacity, its cooling capacity and its functional performance over time. The corrosiveness of the absorbing coolant to the metals in the cooling loop must also be considered. The gaseous $CO_2$ 122 recovered from separator 120 is subjected to densification in unit 110 using the power generated by unit 100.

In an alternative embodiment, (not shown), the conventional engine coolant is used to heat the absorbing liquid rather than exchanging the heat to the atmosphere in a radiator. In a further embodiment, the absorbent is cooled in a refrigeration cycle to enhance its $CO_2$ absorbing capacity before it is contacted with the exhaust gas stream 20.

Figure 6:
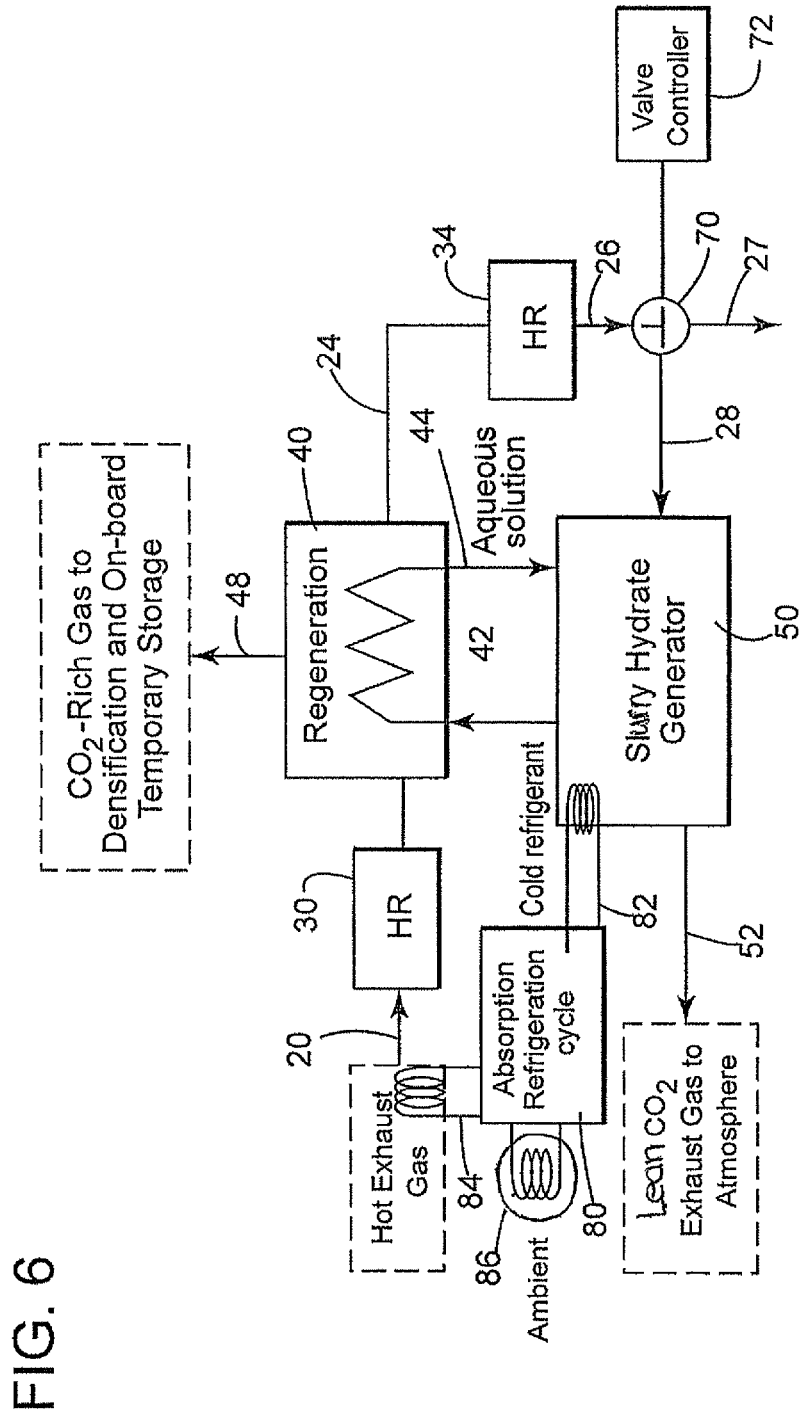
FIG. 6 is a schematic illustration of an embodiment in which a slurry is utilized as the capture agent.

An embodiment in which a slurry hydrate generator is utilized as the capture agent is schematically illustrated in FIG. 6. As in the previously described embodiment of FIG. 4, the hot exhaust gas stream 20 passes through heat recovery device 30, sorbent regeneration zone 40 and then heat recovery device 34 where it is further cooled as exhaust gas stream 26. Three-way valve 70 is actuated by programmed valve controller 72 to admit a predetermined amount of exhaust gas stream 28 into the slurry hydrate generator 50. A suitable capture agent for use in this embodiment is a clathrate compound which forms an inclusion complex in which molecules of $CO_2$ are completely enclosed within another molecule. The resultant material is a slurry of $CO_2$ clathrate hydrates. The $CO_2$ capture occurs at temperatures slightly below ambient, e.g., −10° C. to ambient. The clathrate hydrates can be formed at atmospheric pressure or slightly higher, i.e., 1-10 bar.

With continuing reference to FIG. 6, a refrigeration cycle 80 employing either compression or absorption is utilized for efficient $CO_2$ capture. Cold refrigerant 82 circulates from the refrigeration device 80 in heat exchange with the slurry in generator 50. Cooling of the refrigerant can be by ambient air passage, e.g., coil 86. In another mode of operation, the refrigeration cycle is operated using heat derived via coil 84 from the hot exhaust gas stream 20.

Figure 8:
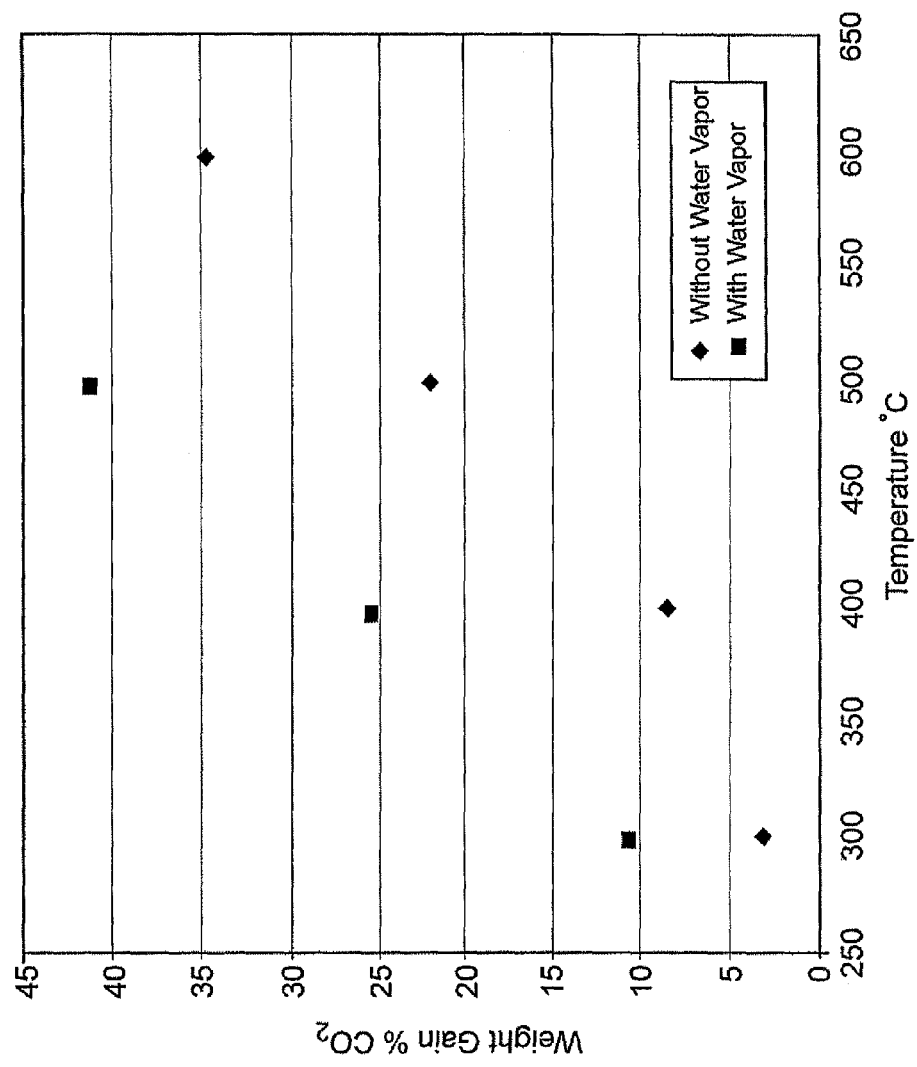
FIG. 8 is a chart illustrating the increase with temperature of the $CO_2$ absorption capacity of a solid aluminate absorbent compound for a pure $CO_2$ gas stream with and without water vapor.

The exhaust gas stream from a gasoline or diesel fueled ICE contains about 13% water vapor. The presence of water vapor can have a positive, a negative, or no effect on the ability of particular adsorbent materials to remove $CO_2$ from the exhaust stream. For example, as illustrated in FIG. 8, the presence of water vapor increases the weight gain of $CO_2$ as a percentage of the solid adsorbent material at relatively lower temperatures. At a temperature of 500° C. and in the absence of water, the weight gain for the adsorbent is about 22%, while in the presence of water vapor the gain almost doubles to about 42%. The relative weight gain at 300° C. and 400° C. is about triple for $CO_2$ in the presence of water vapor. In the case of those absorbents for which the presence of water vapor enhances the $CO_2$ absorption capacity of the material, less adsorbent material can be used for a given capacity of $CO_2$ and can be employed. Adsorbents that benefit from the presence of water in the exhaust stream include aluminate-based and amine-based materials such as calcium aluminate, poly(allylamine), and high boiling point liquid amines supported on porous solids.

Absorbent materials which are adversely affected by water vapor can be utilized in the practice of the invention, if the material has an initial high capacity for $CO_2$ retention that exceeds that of compounds falling into the first two categories.

In any event, substantially all of the water vapor will be discharged to the atmosphere with the nitrogen and any remaining $CO_2$, or removed as condensate during the eventual densification of the $CO_2$.

The $CO_2$ capture agents used in the present invention are different from the typical amine solution used in fixed sources and natural gas purification systems. The typical hot exhaust gases from an internal combustion engine vary in temperature depending on the frequency of engine rotation, load and location along the exhaust system/pipe. The temperature ranges from 130° C. to 650° C., which is too high for the use of an amine solution because typical amine solutions absorb $CO_2$ from room temperature up to 60° C. and are regenerated at from 80° C. to 120° C. Although a heat exchanger or heat recovery system can be used to lower the temperature of the entire exhaust gas stream, due to constraints on the space available in some mobile sources having ICEs that produce a relatively larger volume of exhaust gas, it may not be practical to employ a heat exchanger to lower the entire exhaust gas stream temperature to 60° C. in these sources. In such cases, a portion of the exhaust gas stream can be processed for $CO_2$ capture. Based on tests of various types of commercial motor vehicles, it was found that the temperature of their exhaust gas streams could be lowered to 50° C. by heat exchange.

On the other hand, the high temperature of an ICE exhaust gas stream has the advantage of faster kinetics of absorption and desorption. In a fixed source of $CO_2$ such as a power plant, lower temperature, and low heat of regeneration are important targets to reduce the cost of $CO_2$ capture, but in a mobile source the energy in the exhaust gas stream is usually lost to the atmosphere, so there is no similar penalty.

Embodiments of the $CO_2$ capture component(s) can include, but are not limited to those which follow.

1. The capture agent can be based on chemical or physical absorption of $CO_2$ for separation from the exhaust gases, i.e., chemisorbents or physiosorbents. Physical absorbents can include activated carbons, zeolites, metal organic framework (MOF) materials and organic-inorganic hybrids.
2. The capture agent can be a high boiling temperature liquid or eutectic mixture that physically absorbs $CO_2$ or chemically reacts with it in a reversible manner, such as ionic liquids and heat transfer fluids.
3. The capture agent can be a high boiling temperature solution of a material that chemically reacts with $CO_2$. Suitable agents include reversible chemical absorption in solutions of alkali metal carbonates in high boiling temperature liquids described in embodiment (2) above. The alkali metal carbonates form hydrogen carbonates, e.g., bicarbonates. Potassium hydrogen carbonates start regenerating above 100° C. and rubidium hydrogen carbonates start regenerating above 175° C. Another example is ionic liquid carbonates such as imidazolium-based and pyridinium-based carbonate/hydrogen carbonate. These ionic liquid carbonates are not usually stable in the pure state, but are stable in solution.
4. The capture agent can be a high boiling temperature colloidal solution of very small particles, dispersed and kinetically or thermodynamically stabilized in the liquid, that chemically or physically interact with $CO_2$. Examples are particles made of solids with high $CO_2$ capacity at high temperatures that could be dispersed in the liquids described in embodiment (2) above.
5. The capture agent can be solid particles that physically absorb $CO_2$ or react with it, kinetically suspended in a high boiling temperature liquid. These particles are larger in size than those described in the previous embodiments.
6. The capture agent can be a high boiling temperature solvent that stabilizes the carbamate of a conventional amine solute, so that the regeneration takes place at temperatures higher than aqueous amine solutions.
7. The capture agent can be present in the form of solid absorbents, solid carbonates or other materials that are capable of $CO_2$ absorption. Examples of capture agents include metal oxides, hydrotalcites, zirconates, silicates, aluminates, carbonates, and supported amines. The capture agent can be in the form of a promoted high-surface area support, such as potassium-promoted alumina. The $CO_2$ capture agent can comprise a single class or multiple classes of materials.
8. The capture agents can be prepared as aqueous solutions of quaternary ammonium salts, tetrahydrofuran (THF) and other promoters that encourage $CO_2$ hydrate formation, also referred to herein as phase change, at low pressures, and close to ambient temperatures.

The important parameters for mobile applications include $CO_2$ absorption capacity, thermal and chemical stability, and non-corrosiveness. The desired properties include low vapor pressure, moderate to low heat capacity and low heat of absorption/regeneration. The liquid capture agents described in embodiment (2) above are the simplest, but the solvent capacity might not be high enough for physical absorption. The liquid capture agents described in embodiment (3) above are the most practical and combine physical absorption by the liquid as well as chemical absorption by the carbonate. For example, a flowable powder of sodium carbonate undergoes the following chemical reaction in the presence of water and $CO_2$:

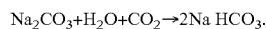

$$Na_2CO_3+H_2O+CO_2 \rightarrow 2Na\,HCO_3.$$

In selecting the capture agent, consideration is given to its long-term stability at the respective exhaust gas temperature of the particular vehicular type and system in which it will be deployed. Exhaust gas temperatures for gasoline engines and diesel engines can vary, and gasoline-fueled engine exhaust is generally hotter under comparable operating conditions. Other factors to be considered include:

a. the types of any contaminants that are present in the fuel due to limitations inherent in the refining processes utilized by different producers;
b. chemical compounds that are inherent in the particular type of fuel and that are oxidized during combustion, such as NOx and SOx;
c. chemical compounds that are introduced into the fuel at the refinery, such as detergents, dyes, anti-knock and lubricity additives; and
d. the amount of any particulates that are formed during the combustion in the engine and any particulate filtration system present.

The following examples are illustrative of liquid adsorbents.

Example 1

The composition of an exhaust gas by mole percent is 13% $CO_2$, 13% water vapor ($H_2O$), 73% nitrogen and 1% of other inert gases. At room temperature, the solubility of $CO_2$ in the ionic liquid (p-vinylbenzyl)trimethylammonium hexafluorophosphate is estimated to be 77 wt % of the liquid. See Somsak Supasitmongkol et al., "High $CO_2$ Solubility In Ionic Liquids And A Tetraalkylammonium-based Poly(ionic liquid)." *Energy & Environmental Science,* 2010, 3, 1961-1972, the disclosure of which is incorporated herein by reference.

It has been found that a particularly useful solid sorbent for gaseous $CO_2$ is a mixed salt composition that comprises a mixed salt of a magnesium compound, such as $MgCO_3$ or MgO, and at least one salt of a Group IA metal, wherein the molar ratio of Mg to the Group IA metal can range from 8:1 to 3:1, and is preferably from 6:1 to 4:1. The magnesium compound is preferably MgO and the at least one salt of a Group IA metal is preferably a carbonate, and/or a nitrate salt. An especially preferred sorbent composition is MgO:$Na_2CO_3$:$NaNO_3$, where the molar ratio of Mg:Na is about 4:8 to 1. Salts of Li, K, or Rb can replace the sodium salts in the preferred composition.

The mixed salt sorbents of the invention can be made via, e.g., a gelation reaction, as described below in Example 1, or preferably by a precipitation reaction as described in Example 2. A magnesium salt and a Group IA metal salt are prepared in solution form, and combined to form a reactive mixture. This reaction is optionally carried out with a precipitating agent. The salts are chosen such that, upon reacting with each other, MgO or $MgCO_3$ is formed in the precipitate. Preferably, a highly soluble Mg compound is used, such as MgO itself, $Mg(OH)_2$, or most preferably, $Mg(NO_3)_2$. As noted supra, $MgCl_2$ or $Mg(CH_3COO)_2$ may also be used. Once the Mg salt is chosen, the skilled artisan can determine what Na salt or salts will react with the Mg salt to produce the desired MgO/$MgCO_3$.

Following preparation, the sorbent powder can be made into an extrudate, either via adding a binder, such as boehmite, or via special preparative techniques known in the art which can result in a loss in sorbency; however, the technique is useful for keeping pressure drops low in packed beds, and for rendering handling of the material easier. Using the powdered salts described, a greater $CO_2$ adsorption capacity was found for extrudates made without a binder which achieved $CO_2$ loads of about 20 wt % at 300° C. The crush strength of extrudates without binder was found to be 0.51 MPa, equivalent to those extrudates prepared with boehmite (0.55 MPa).

The reaction is carried out with concentrations of the reactive salts which provide for a ratio of Mg:Group IA metal of from 3:1 to 8:1, most preferably from 4:1 to 6:1. The choice of ratios is one left to the artisan because, as noted supra, by varying the ratio one produces sorbents with different properties. Knowing the conditions under which the sorbent will operate will determine the ratios employed. Optionally, a precipitating agent can be added to facilitate the reaction, such as $NaNO_3$. The precipitating agent is preferably a salt of a Group IA metal.

Example 1

This example describes the preparation of a solid $CO_2$ sorbent for use in the process of the invention by what is referred to as a gelatin process. An amount (395 g) of magnesium carbonate hydroxide ($MgCO_3$— $Mg(OH)_2$x$H_2O$) was added to 800 ml of a solution of sodium carbonate (42.18 g) and sodium nitrate (21.63 g) dissolved in deionized water. This produced a mixed salt slurry which was stirred for 30 minutes. The slurry was then covered and allowed to sit for 16 hours at ambient temperature, after which it was dried at 120° C. for 16 hours to form a dry cake of MgO:$Na_2CO_3$:$NaNO_3$. Analysis showed a mass ratio of 75.8:16:8.2 and a molar ratio of Mg:Na of about 4.8. This dry cake was then calcined by heating from 120° C. to 450° C., at a ramp rate of 3° C./minute, followed by 450° C. for 4 hours. The calcined cake was crushed and sieved to collect a 150-425 mesh fraction, which is suitable for use in a packed bed with an inert material such as SiC to occupy any remaining volume. Test results indicated that the loading of $CO_2$ on the sorbent reached its maximum at 300° C., but that the sorbent was effective over a broader range of temperatures.

Example 2

This example describes preparation of a solid $CO_2$ sorbent of the same mixed salt composition for use in invention by what is referred to as a precipitation process. A solution of 233.4 g of $Na_2CO_3$ in 3000 ml deionized water was placed in a 5.0 liter plastic beaker, and stirred vigorously with a mechanical agitator. A second solution, of 188.4 g $Mg(NO_3)_2$: 6 $H_2O$ in 500 ml of deionized water, was pumped into the first solution, at a rate of approximately 30 ml/minute. A slurry resulted which was stirred for an hour. The slurry was stored, overnight, as described supra, and then filtered to yield a wet precipitate cake. About 3200 rills of filtrate were collected. This was dried, at 120° C. for 24 hours to form a dry cake, which was treated a described in Example 1. Test results indicated that the amount of $CO_2$ loaded on the sorbent reached its peak at 325° C., and as with the sorbent from Example 1, the sorbent product from this example was also effective over a wide temperature range.

The effect of the alkali component in the mixed salt sorbent composition was evaluated using Li, Na, or K salts to prepare the final sorbent products. Salts were prepared in the mariner set forth, supra, using a molar ratio of Mg:alkali metal of 6:1. The resulting products were tested for their ability to remove $CO_2$ from a simulated exhaust gas stream. Adsorption was carried out at temperatures ranging from 100-450° C., at GHSV of 3,125/hour. The sorbents were regenerated by ramping temperatures to 450° C., at a rate of 10° C./minute, and a GHSV of 2500/hour.

Results indicated that Na produces the best operational temperature range and that Li and K alkali metals function well at different temperatures. The sorbent containing sodium adsorbed $CO_2$ over a temperature range of 200° C. to 400° C., reaching a maximum at 325° C. The powder containing lithium was most effective at 200° C. and was effective to about 250° C., while the compound containing potassium adsorbed $CO_2$ at a higher temperature ranging from about 300° C. to about 400° C.

Additional tests indicated that the mixed salt compositions of the invention should have either $Mg_2CO_3$ or MgO as a component, and in the preparation of these sorbents, an Mg compound preferably is selected which will lead to one of these.

$Mg(NO_3)_2$, MgO, and $Mg(OH)_2$ were all tested using the same parameters of Examples 1 and 2. The nitrate salt produced a sorbent with a significantly greater ability to adsorb $CO_2$ than the MgO or $Mg(OH)_2$ salt, but all adsorbed $CO_2$.

It is noteworthy that $Mg(NO_3)_2$ has significantly greater solubility in water than the other compounds. The differences in solubility also indicate that the final products result from different reactive mechanisms. The nitrate salt, for example, participates in anion exchange with the sodium salts, whereas the oxide and hydroxide do not. Hence, the more soluble the magnesium salt, the greater the adsorption ability of the final product. $Mg(NO_3)_2$, $MgCl_2$, $Mg(CH_3COO)_2$, and other highly soluble magnesium salts are thus preferred in making the sorbents of the invention.

The concentration of sodium affects performance of the sorbents, with optimum adsorption capacity at different temperatures. A decrease in the concentration of Mg relative to Na resulted in a change in the peak $CO_2$ loading temperature to from 250° C. to 275° C. as compared to 325° C.-350° C. In contrast, an increase in $CO_2$ loaded on the sorbent was observed, from about 20 wt % as compared to 12-13 wt % for the higher concentrations.

While the above tests used $Na_2CO_3$ as a precipitating agent, others can be used, as was exemplified with $(NH_4)_2CO_3$.

To prepare the sorbents with $Na_2CO_3$, the precipitating agent was added slowly in the form of a solution, to a solution of $MgNO_3$. The $(NH_4)_2CO_3$ was added to a solution of $MgNO_3$ and $Na_2NO_3$ while maintaining the Mg:Na molar ratio of 6:1. The results showed that the product obtained with $Na_2CO_3$ exhibited a broad range of activity, whereas that prepared with $(NH_4)_2CO_3$ showed a very sharp spike in $CO_2$ adsorbence activity at 300° C., and very little activity at other temperatures. These results suggest that changes in the precipitating agent can be used to prepare sorbents for different applications.

In the practice of the invention, $CO_2$ is adsorbed from an exhaust gas stream by contact with the mixed salt sorbent described at a temperature which ranges from about 100° C. to about 450° C., preferably from about 250° C. to about 350° C., for a time sufficient for the sorbent to remove all or a portion of the $CO_2$ from the exhaust gas stream. As previously described, the sorbent will become saturated with $CO_2$, and this can be determined by measuring and comparing the content of $CO_2$ in exhaust gas stream before and after contact with the sorbent. When it is evident that no further $CO_2$ is being removed from the exhaust stream, the sorbent can be regenerated by, e.g., heating it to its desorption temperature, e.g., about 500° C. Again, by measuring the amount of $CO_2$ which is contained in the exiting gas, the ordinarily skilled artisan can determine when the sorbent is ready for reuse.

The absorption and desorption cells can be of different designs. Shell-and-tube exchangers can be used where the adsorbents circulate through the tubes. Other types of heat exchangers can be used to circulate the capture agent(s). These include plate, spiral, cross-flow, and other types. It is possible to combine both the absorption and desorption zones in one unit to allow for very compact and very efficient exchange of the heat of absorption/desorption. The heat of absorption will be released as the $CO_2$ is captured and will be conducted or otherwise conveyed to the other side to provide at least a portion of the heat required for the regeneration of the adsorbent. The absorption unit should provide direct contact between the exhaust gas and the capture agent. Suitable devices include static and dynamic mixers, packed and tray columns and membrane contactors.

Two capture cells have been illustrated for the swing circulation process between absorption and desorption; multiple cells can be used to provide for different absorption/desorption cycles.

In addition to the temperature swing absorption schematically described in the schematic illustration of FIG. 3 and with additional specificity in the illustration of FIG. 4, other processes such as pressure swing, vacuum swing and electrical swing absorption can be employed alone or in combination. The gas flow rate of the capture agent through the capture cells can be regulated based on detected $CO_2$ concentrations in the exhaust outlet, predetermined defined operational times, and other criteria that are selected to ensure maximum/optimum utilization of the $CO_2$ capacity of the capture agent.

FIGS. 5 and 6 also show optional locations for the heat recovery (HR) components 30, 32, 34 which serve to convert heat energy to mechanical work or electrical power that can be used to operate the densification apparatus of the system and other auxiliary equipment, such as sensors, thermocouples, the system control unit and valves. Active cooling of the low temperature side of these devices with a liquid heat transfer agent is preferred because liquids are capable of carrying and delivering the large amount of heat that these capture agents exchange during absorption and regeneration. The heat capacity of liquids per unit of volume, i.e., their volumetric heat capacity, is about 100 times greater than that of gases. Thus, for the same volume, a liquid can remove or provide heat at a rate which is about 100 times greater than a gas. Similarly, for the same quantity of heat to be added or removed, the volume of liquid needed is but about $\frac{1}{100}^{th}$ of the volume of gas that would be required.

It is preferable that the $CO_2$ be removed from exhaust gases downstream of the catalytic converter on vehicles that are so equipped. This is because the exhaust will have less contaminants that could adversely effect the absorbent. In addition, when the engine is cold at start-up, the exhaust gas downstream of the catalytic converter will be hotter than upstream due to the exothermic reactions that occur in the converter.

The $CO_2$ densification component can be accomplished by single or multiple stage compressors with an appropriate active/passive cooling system to ensure pressurization, liquification or solidification of $CO_2$ for the temporary on-board storage. The $CO_2$ storage can be in a single tank or in multiple tanks on board the mobile source. The fuel tank can also be used to store the captured $CO_2$ by having a moving partition between the fuel side and the $CO_2$ side. Control of all of the system components can be integrated with the mobile source's control system or a separate control system to optimize performance.

Figure 7:
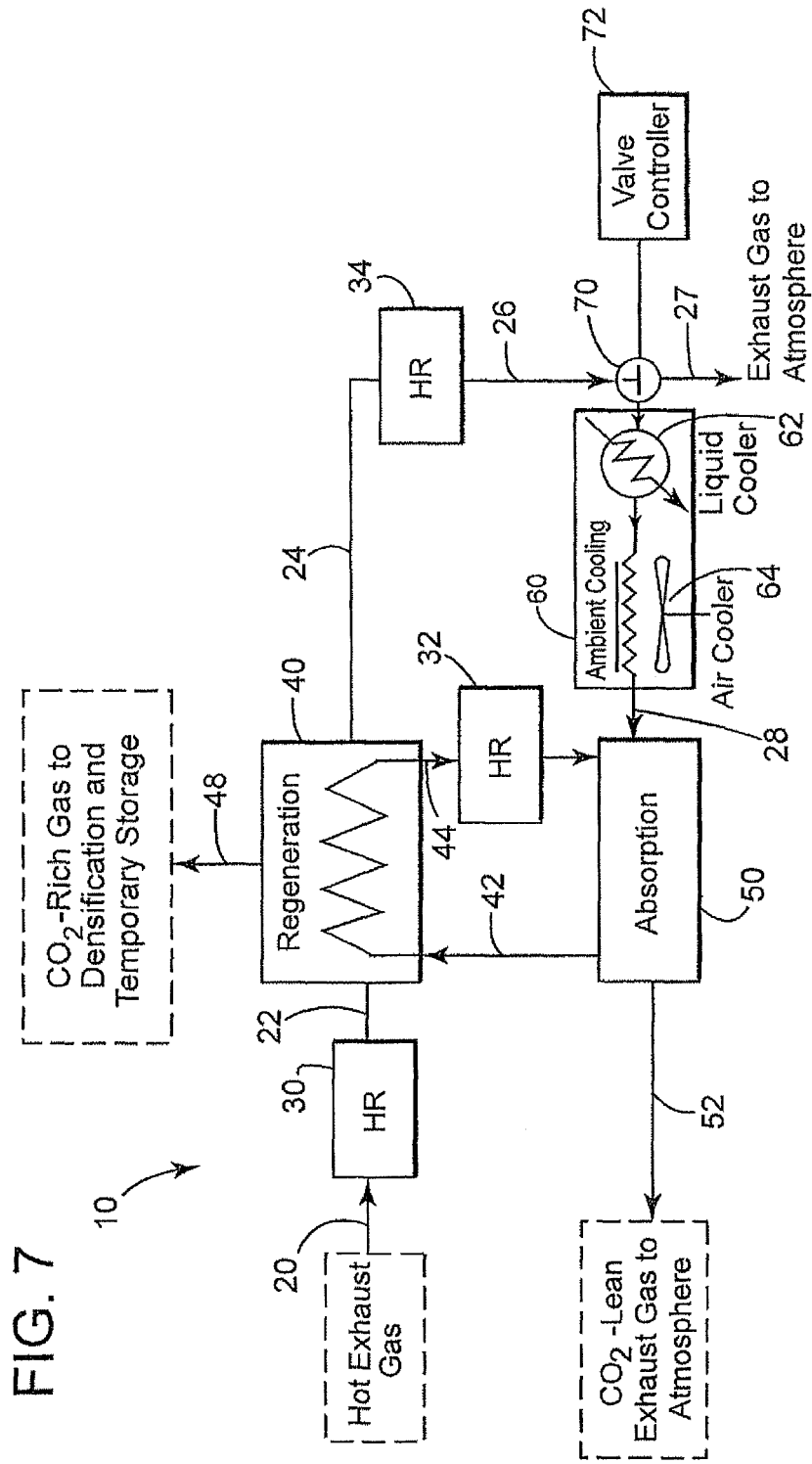
FIG. 7 is a schematic illustration of an embodiment in which a liquid absorbent is utilized as the capture agent and the exhaust gases are cooled by heat exchangers.

Referring now to FIG. 7, an embodiment of the system 10 is schematically illustrated which incorporates an ambient cooling zone 60 for reducing the temperature of the exhaust gas stream that includes, for example, a water or other liquid-cooled heat exchange 62 and/or an air cooling unit 64 which directs ambient air over coils or other channels through which the exhaust gas stream 26 passes. The cooled exhaust gas stream 28 then enters the absorption zone 50 where it is contacted with the liquid amine solution which captures all or a substantial portion of the $CO_2$ in the cooled exhaust gas stream 28 by absorption. The remaining exhaust gases 52, which have no or a diminished $CO_2$ content are discharged onto the atmosphere.

The absorption zone 50 can be operated in swing circulation mode with parallel absorbers. In the swing mode of operation, the contents of one absorber are regenerated by exchange with the hot exhaust gas stream in regeneration zone 40. The saturated amine solution 42 passes from the absorption zone 50 via conduit 42 to the regeneration zone 40 from which the $CO_2$ rich gas stream 48 is withdrawn for densification and storage. The fresh regenerated amine stream 44 is returned to absorption zone 50 after being cooled by passage through heat recovery device 32. The temperature of the absorbent stream 42 passing through the regeneration zone 40 is controlled to desorb all or substantially all of the $CO_2$ and to avoid overheating the solution since it must be cooled for recycling to the absorbent zone 50.

In an alternative embodiment (not shown), stream 42 and 44 pass in heat exchange with each other in place of the heat recovery unit 32. Hot stream 44 will partially heat cooler stream 42, thus allowing better overall heat management. The same heat exchange arrangement can be applied to the embodiments of FIGS. 4, 6, 7, 11 and 12.

A three-way valve 70 is actuated by a programmed processor/controller 72 that receives signals from one or more pressure and/or temperature sensors (not shown). In the embodiment of FIG. 7, valve 70 is downstream of heat recovery device 34 and controls the proportion or fraction of the exhaust gas stream 26 that is passed to the absorption zone 50, the balance being discharged to the atmosphere via conduit 27. Valve 70 can also be actuated to discharge all of the exhaust gas stream 27 to the atmosphere in the event that the operating conditions of the ICE, such as rapid acceleration or increased load preclude routine system operational sensor analysis and programmed control of the fraction of the exhaust gas stream 26 that should be diverted to the absorption unit 50.

Figure 9:
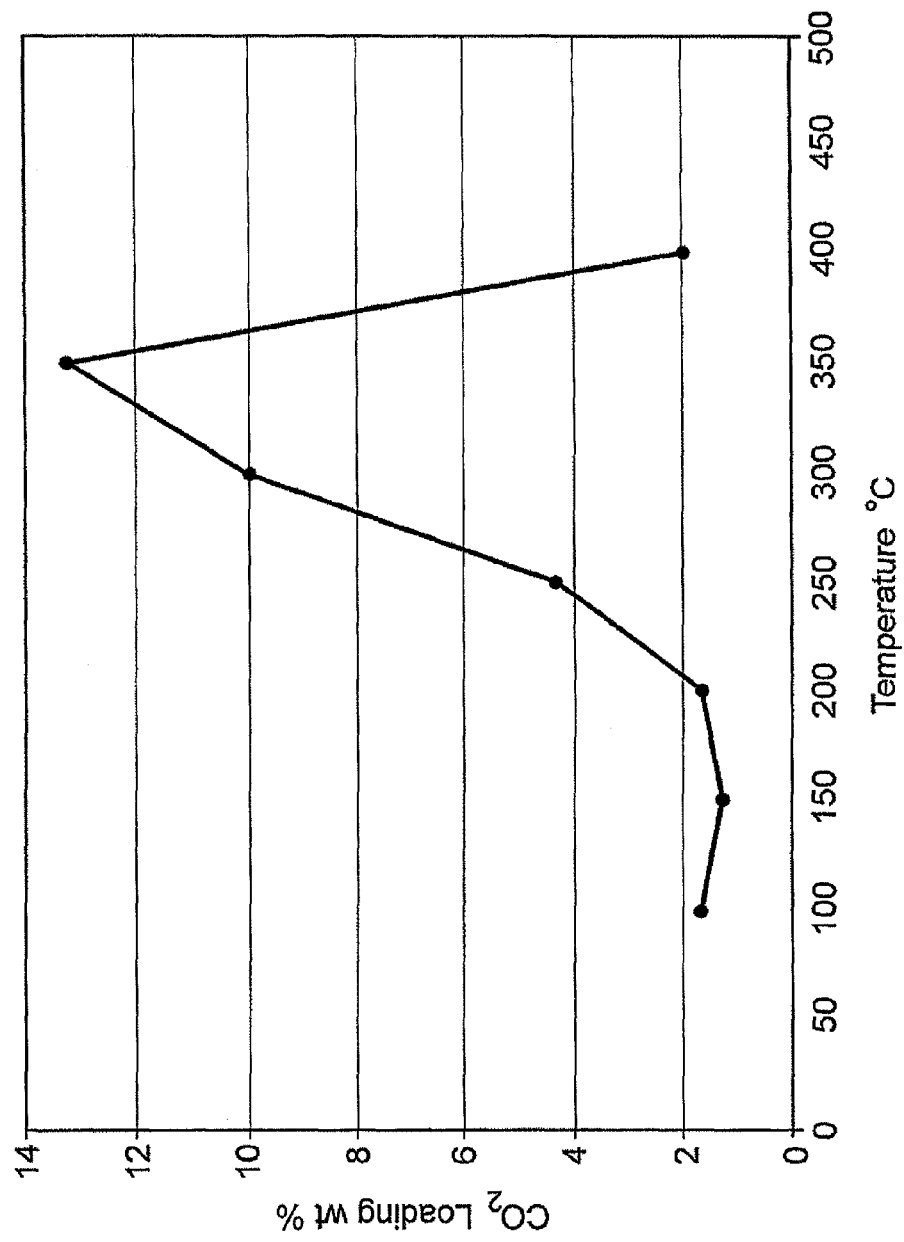
FIG. 9 is a chart illustrating the typical variation of $CO_2$ absorption capacity in relation to the operating temperature of a solid alkaline earth metal and alkali metal compound.

Heat management is required to control the absorption and desorption cycles of the $CO_2$ capture agent. FIG. 9 is a chart illustrating the typical variation of $CO_2$ adsorption capacity in relation to the operating temperature of a solid alkaline earth metal and alkali metal composition, such as the one described infra. As illustrated in FIG. 9, the $CO_2$ adsorption capacity of an adsorbent can vary significantly with temperature. In the example shown, the capacity of a solid alkali metal compound-containing adsorbent increases to a maximum as the temperature approaches 350° C., and then rapidly diminishes between 350° C. and 400° C.

Figure 10:
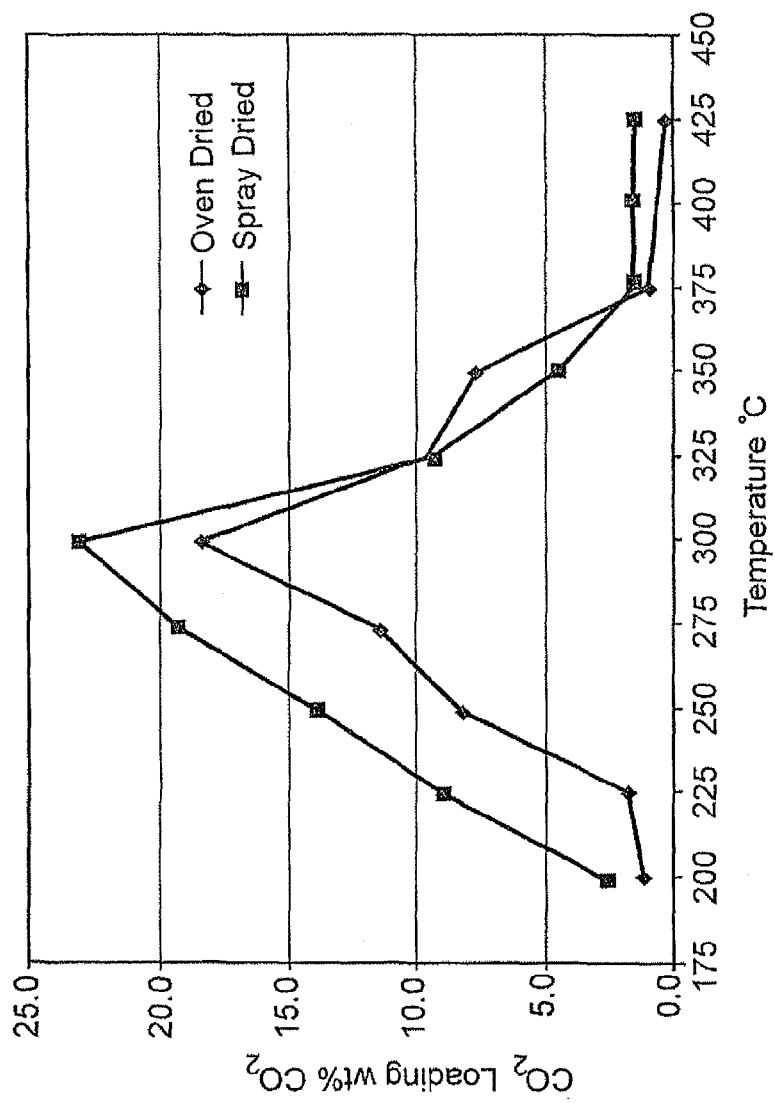
FIG. 10 is a chart illustrating the typical variation of $CO_2$ absorption capacity in relation to the operating temperature of a high boiling temperature colloidal solution of very small particles.

FIG. 10 is a chart illustrating the typical variation of $CO_2$ adsorption capacity in relation to the operating temperature of solid particles. The $CO_2$ adsorption capacity is about 23% at 300° C. for a spray dried particle which is the optimum temperature to use this type of adsorbent. Heat will have to be removed from the capture component(s) as the $CO_2$ is adsorbed, either physically or chemically and the heat of adsorption is released. Heat will have to be supplied to the capture components) to provide the required heat of desorption/regeneration when the $CO_2$ is to be released from the agent. Supply and removal of heat can be accomplished using methods that include conduction, convection, radiation, heat generation, and/or a combination of these methods.

In the case of conduction, heat can be supplied or removed from the $CO_2$ capture agent using a thermal conducting material, such as metal. If the $CO_2$ capture agent passes through tubes, the heat can be removed from the outside of tubes using conduction through the tube shell. Fluids can be used to supply or remove the heat from the outer shell of the tubes. Fins, metal mesh inside the tubes and other designs and known techniques can be used to increase the surface area in contact with the capture agent and enhance the heat transfer. Fins and other surface changes can also be used on the outer shell of the tube to enhance the heat transfer of the system. The $CO_2$ capture agent can also be passed on the outside of the tubes and the inside of the tube used to supply or remove the heat using fluids.

In general, commercially available plate-type compact heat exchangers have been found to be effective in reducing the temperature of the exhaust gas stream. They are available in a variety of sizes and materials of fabrication. The large heat transfer surface permits use of a relatively smaller device, saving both on volume and weight added to the vehicle.

For radiant heat exchange, heat can be supplied to the agent for regeneration. High-temperature sources or microwave can be used to supply the heat. Heat can also be supplied to the $CO_2$ capture agent though a heat generating component(s) such as electric heaters powered, e.g., by thermoelectric devices.

The figures identify locations for placement of HR components. Single or multiple technologies can be used to convert the waste heat to electrical energy or work to compress the $CO_2$ and to power the auxiliary equipment. The size or capacity, location and operating conditions of the HR components are determined based upon the availability of waste heat, e.g., from the engine exhaust stream. This will include both temperature and the volumetric flow rate of the waste heat stream, whether it be the exhaust or engine coolant. A single or more than one type of heat recovery component can be employed depending upon the nature of the waste heat stream and its temperature and flow conditions.

The operation of the heat/energy recovery system can be controlled by a pre-programmed processor and controller that receives data from temperature and flow sensors, and that is in controlling communication with flow-regulating valves. For example, the temperature of the engine exhaust gas can be controlled by passing it into heat exchange contact with the container of saturated capture material in order to raise its temperature sufficiently to release the $CO_2$. The exhaust gas having a lower temperature can then exchange further heat with a thermoelectric device to produce electricity. Finally, the exhaust gas of relatively lower temperature can be introduced into the absorption zone for reduction of its $CO_2$ content before being discharged into the atmosphere.

The type of heat recovery (HR) component(s) used in the practice of the invention can include, but are not limited to the following types of apparatus.

1. Thermoelectric devices, or modules, that generate electric power. The hot side of the thermoelectric module is installed on the exhaust gas side and the cold side is installed in a closed cooling system referred to as an active system or exposed to air (a passive system). The thermoelectric module(s) remove part of the heat from the hot side and generate electrical power that can be used to operate the densification apparatus and/or other on-board equipment.

Thermoelectric devices used to convert the waste heat to electrical energy can be placed in different locations and arrangements to optimize the energy conversion. The thermoelectric devices can be secured in heat conductive contact with the exhaust pipe, capture components, engine block or other engine components as the hot side of the device. The cold side of the thermoelectric device can be exposed to air convection to cool the device. The cold side of the thermoelectric device can also be in contact with an active cooling system, e.g., a circulating liquid, to facilitate heat transfer and also control the thermoelectric module's performance. As previously noted, the heat capacity of a liquid coolant is about 100 times the capacity of a gas to transfer heat.

The thermoelectric devices can assume different shapes such as cylindrical or rectangular pipes to minimize the pressure drop effects on the exhaust gases. Internal and/or external fins can also be used to enhance the heat transfer of the thermoelectric devices and hence their performance. Thermoelectric device could be mounted very close to, or on the engine block to make use of the high temperatures. Appropriate materials are selected to withstand the high temperatures.

2. Electrical power generated using thermoelectric module(s) can be supplied to an electrical storage system, e.g. batteries, which in turn supply the electrical power to the densification apparatus and/or other equipment. Selection of the semiconductors for the thermoelectric module(s) is based upon the temperature range of the application. Stacking of different thermoelectric devices can be used to optimize the heat recovery and hence the electrical energy generation.

3. A Stirling engine in which the waste heat from the ICE exhaust is supplied to the wall of one or more cylinders of the engine to expand the gas in the cylinder to thereby drive a piston that can perform the necessary mechanical work to run the densification compressor or to run the compressor of a compression refrigeration cycle unit that provides cold refrigerant to liquefy or solidify the $CO_2$.

4. A steam generator that provides steam to a turbine which generates mechanical work to run the densification compressor or to run the compressor of a compression refrigeration cycle unit that provides cold refrigerant to liquefy or solidify the $CO_2$.

5. A small shape memory alloy engine or compressor utilizes the waste heat to change the shape of an alloy (such as CuSn, InTi, TiNi, and MnCu) and generates mechanical work that is used to increase the density of the captured $CO_2$. The engine compressor works by having a hot side and a cool side of the alloy to generate the compression needed. The following patents describe heat engines based on these types of unusual alloys: U.S. Pat. No. 3,913,326; U.S. Pat. No. 4,055,955; U.S. Pat. No. 5,442,914; U.S. Pat. No. 7,444,812; and published application 2009/0315489. The disclosures of these patent documents are incorporated herein by reference.

6. Single or multiple heat recovery systems can be installed on the exhaust gas and coolant systems.

7. Single or multiple heat recovery systems can be installed to generate the required power and effectively control the temperature of the exhaust gas.

8. In addition to supplying power, the heat recovery component(s) can be used to control the temperature of the exhaust gas and hence optimize the performance of the $CO_2$ capture agent.

As will be understood from the above description and examples, the methods and systems of this invention are suitable for use in a wide range of mobile sources such as passenger vehicles, trucks, buses, heavy-duty vehicles, train, ships and others that operate through the combustion of hydrocarbon fuels. This invention can be installed on new mobile sources or by retrofitting existing mobile sources.

The present invention addresses post-combustion $CO_2$ capture and on-board storage from mobile sources. To minimize operational cost and equipment requirements, the available heat, which is conventionally discharged into the atmosphere, is used to provide the energy needed to separate the $CO_2$ extracted from the combustion gases from the absorbent material, or capture agent, and to compress/liquefy all or part of the produced $CO_2$ for efficient on-board storage. The captured $CO_2$ can be stored on board until refueling, when it is discharged or removed for recovery at the fueling station. The apparatus of the invention is easier to deploy on board as compared to methods that have been proposed that involve chemical reactions, such as reforming, or major changes in engine design, such as by providing cylinder walls that are permeable to $CO_2$ At 150° C., the Henry's law constant for the ionic liquid 1-butyl-3-methylimidazolium hexafluorophosphate is, by extrapolation, estimated to be 265, which gives a very low $CO_2$ solubility of 0.01 wt %, and the compound is therefore not suitable for use in the method of the invention. See U.S. Pat. No. 6,579,343.

Example 2

The composition of an exhaust gas in mole percent is 13% $CO_2$, 13% water vapor ($H_2O$), 73% nitrogen and 1% of oxygen and other gases. Table 1 shows the optimum $CO_2$ capture temperature, $CO_2$ capacity and regeneration temperature of several liquid adsorbents.

TABLE 1

| | Estimated Range of optimum $CO_2$ capture temperature, ° C. | Estimated Regeneration Temperature, ° C. | Estimated maximum $CO_2$ capacity for 25 wt % solution: | Estimated maximum $CO_2$ capacity for 50 wt % solution: |
|---|---|---|---|---|
| Liquid solution of $Na_2CO_3$ | 65-75 | >120 | 10 wt % | 20 wt % |
| Liquid solution of $K_2CO_3$ | 100-125 | >150 | for 25 wt % solution: 8 wt % | for 50 wt % solution: 16 wt % |
| Liquid solution of $Ru_2CO_3$ | 175-200 | >250 | for 25 wt % solution: 5 wt % | for 50 wt % solution: 10 wt % |
| Suspension of solid particles of promoted MgO in liquid | 250-325 | >400 | for 25 wt % suspension:* 14 wt % | for 50 wt % suspension:* 27 wt % |

In preparing the data for the above Table, it was assumed that the solvent had no or a very low $CO_2$ adsorption capacity. Solvents can be selected from (a) water at elevated pressure to prevent vaporization above 100° C., (b) ionic liquids, and (c) molten salts for use at the maximum temperatures. The solutions are organized according to increasing optimum capture temperatures. A relatively low capture temperature will require a large heat exchanger to cool the exhaust gas stream, but more sensible heat is available from the hot exhaust gas to regenerate a larger volume of the solution leading to a larger percentage of $CO_2$ capture from the exhaust gas. Note that the percentage of $CO_2$ captured from the exhaust gas differs from the maximum solution capacity listed in the table. The capacity is a physical, i.e., thermodynamic property, and the percentage of $CO_2$ captured from the exhaust gas stream depends principally on the relative amount of solution used and its circulation rate, among other factors.

In the above Table, it is also assumed that only half of the MgO is available for reaction with $CO_2$.

As noted supra, solid $CO_2$ adsorbents may also be used, especially those which contain a Group IA metal salt, e.g., Na, Li, K, Rb, with Na being preferred, as well as an Mg salt.

Figure 11:
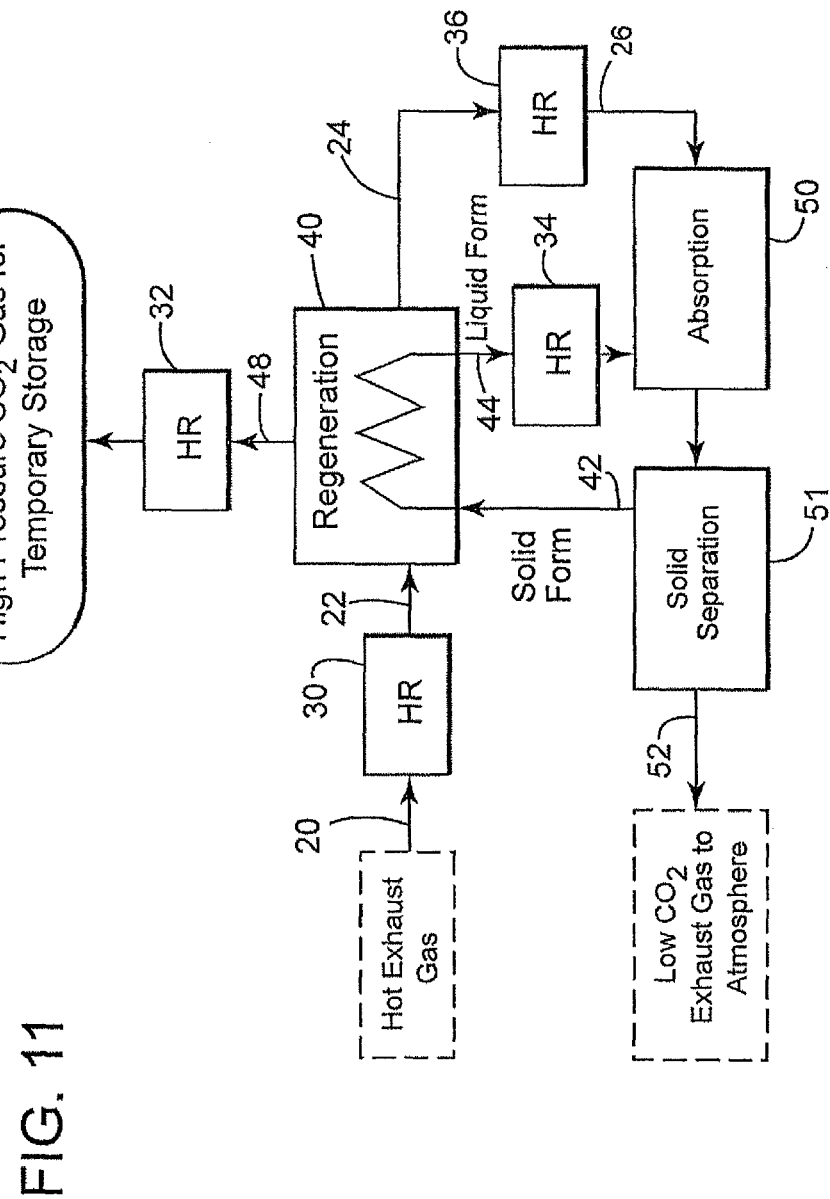
FIG. 11 is a schematic illustration of an embodiment of the invention utilizing a reversible phase-changing sorbent.

A further embodiment of the invention will be described with reference to FIG. 11 which illustrates a system and apparatus for the practice of a $CO_2$ absorption process using chemical phase-changing sorbents. The system includes a regeneration unit 40, a chemical absorption/adsorption unit 50, and several heat recovery (HR) devices 30, 32, 34 and 36. Chemical sorbents such as liquid di-amines and other liquids functionalized with amine groups that are capable of forming a reversible chemical bond with $CO_2$ can be used in this embodiment. An example of such a chemical sorbent is liquid GAP-0 carbamate which reversibly changes to the solid phase after chemically reacting with $CO_2$. The reaction proceeds as follows:

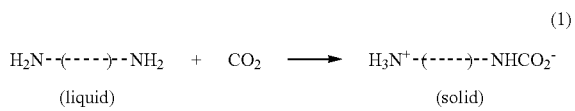

(1)

The captured $CO_2$ can be released from the sorbent by heating the solid material, in which process the solid sorbent changes back to the liquid phase, as represented by the following:

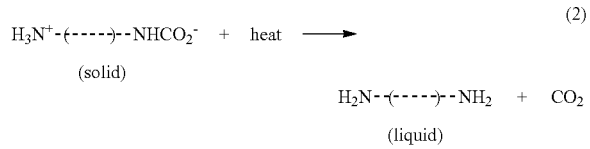

(2)

In the chemical process of $CO_2$ capture and regeneration, the hot exhaust gas stream 20 from a vehicle's ICE passes through a first heat recovery unit 30 that operates at relatively high temperature, e.g., 300° C.-650° C., to convert some of the waste heat into electrical or mechanical energy. The moderately cooled exhaust gas stream 22 is then passed to the regeneration unit 40 where solid sorbent 42 is heated and regenerated by reaction (2) above, in heat exchange using heat from the exhaust gas stream 22. The exhaust gas stream and sorbent are not in direct contact with each other in the regeneration unit 40. The liquid sorbent 44 discharged from regeneration unit 40 is passed to heat recovery unit 34 to lower the temperature of the sorbent to a predetermined value for contact and reaction with the $CO_2$. The cooler exhaust gas stream 24 that is discharged from regeneration unit 40 is conveyed to heat recovery unit 36 to lower the temperature of the exhaust gas stream to a predetermined value. Exhaust gas stream 26 exiting HR device 36 is brought into contact with liquid sorbent in the chemical absorption unit 50 where $CO_2$ contained in the exhaust gas is absorbed by the liquid in accordance with reaction (1). Solid sorbent with the captured $CO_2$ that is formed in the adsorption unit 50 is separated from the exhaust gas using an appropriate unit such as a cyclone or a filter in unit operation 51, and recycled through the regeneration unit 40 to produce fresh liquid sorbent. The remaining exhaust gas stream 52 containing a reduced amount of $CO_2$ is released to the atmosphere.

The pressure and temperature of $CO_2$ stream 48 released in the confined space of the regeneration unit 40 is relatively high. The temperature of the $CO_2$ gas can be reduced by passage through a heat recovery unit 32 after which the $CO_2$ can be transferred to a pressure tank for temporary storage, or subjected to densification in accordance with methods and apparatus previously described.

Figure 12:
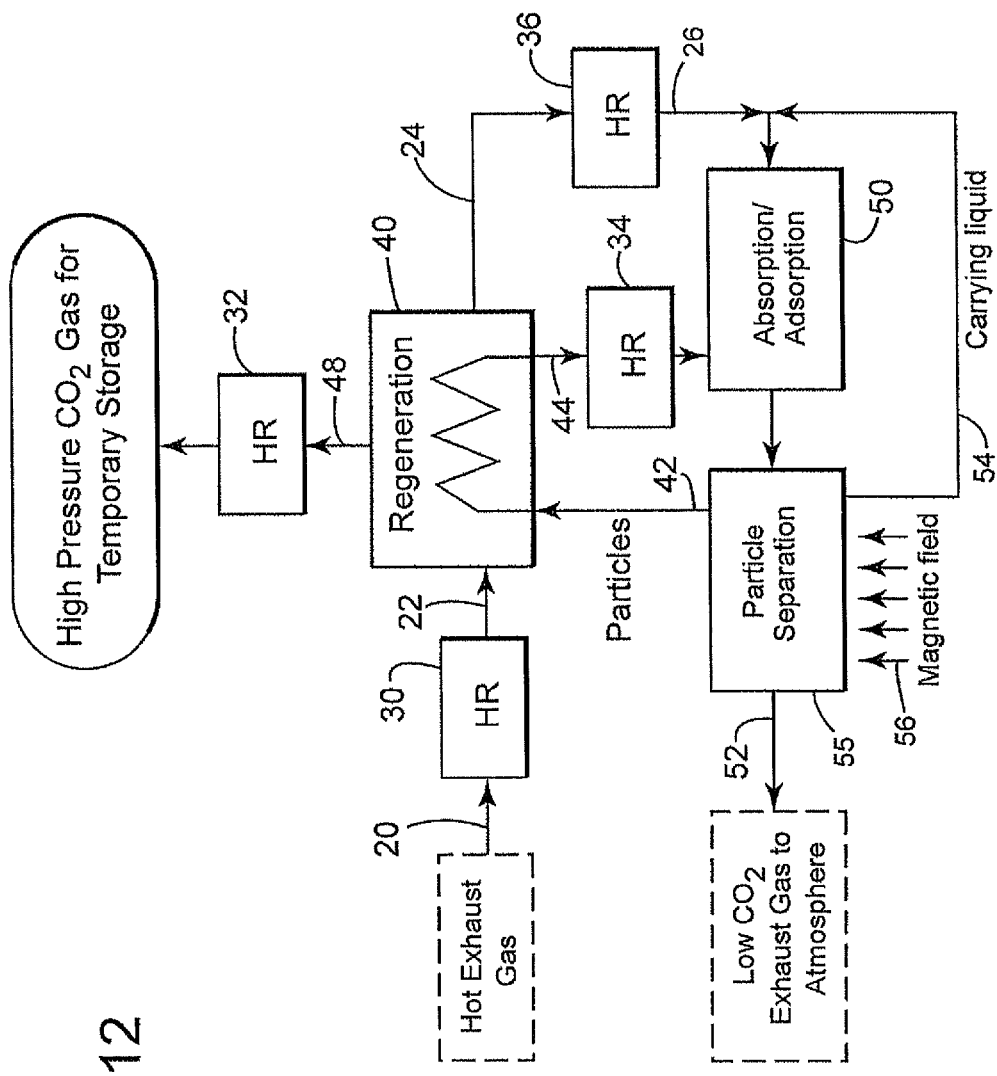
FIG. 12 is a schematic illustration of an embodiment utilizing magnetic particles coated with a reversible $CO_2$ sorbent material.

Another embodiment of the process of the invention will be described with reference to FIG. 12 which illustrates a system and apparatus for a $CO_2$ capture process using a solid capture reagent having a magnetic core. The system includes an absorption/adsorption unit 50, a regeneration unit 40, a magnetic separation unit 55 with a magnetic field source 56 and several heat recovery (HR) devices 30, 32, 34 and 36. The $CO_2$ capture is based on chemical absorption or physical adsorption. In either case, the $CO_2$ is released by heating the capture agent and the overall operation of the system of FIG. 12 is similar to that of FIG. 11, as described above. Suitable solid capture agents include metal carbonates, bi-carbonates, oxides, activated carbons, zeolites, metal organic framework (MOF) material and organic-inorganic hybrids. The magnetic core can include magnetic materials such as iron, cobalt and their oxides. (See, for example, The American Institute of Chemical Engineers (AIChE) Journal, November 2004 Vol. 50, No. 11, page 2835).

The carrying liquid can be one or a combination of (a) a high boiling temperature liquids or a eutectic salt mixture that provides stability to the particles by kinetic or thermodynamic means; or (b) a high boiling temperature solution of a material that that stabilizes the suspended particles by kinetic or thermodynamic means. With continuing reference to FIG. 12, a liquid suspension 53, 54 of solid capture reagent material having magnetic cores is circulated in the system to capture and release $CO_2$. After the absorption step, the liquid suspension is sent to a particle separation vessel 55 where it is subjected to a magnetic field 56 that causes the particles to rapidly migrate towards the field, thereby separating and concentrating the particles from the carrying liquid 54 which is recirculated and mixed with the exhaust gas stream 26 for introduction into the absorption/adsorption zone 50.

The particles 42 containing $CO_2$ are conveyed to the regeneration zone 40 to be heated in heat exchange relation with exhaust gas stream 22 to release the $CO_2$. The hot regenerated particles 44 pass through HR device 34 and cooled for reintroduction into the absorption/adsorption zone 50 where they are mixed with the incoming carrier liquid stream 54 and cooled exhaust gas stream 26.

In a further embodiment of the present invention, a portion of the $CO_2$ that is recovered after regeneration of the capture agent is returned via a suitable conduit to the air intake of the engine to be mixed with the atmospheric air and fuel. This aspect of the system operation is similar to the known methods for exhaust gas recirculation (EGR) that is currently used to reduce engine operating temperatures and thereby to reduce the amount of $NO_x$ compounds produced during the burning of the fuel. An amount of $CO_2$ equivalent to from 5 to 15 percent of the exhaust gas volume can be returned to the intake. Return of the $CO_2$ also reduces the amount of atmospheric nitrogen drawn in with the fuel mixture, which also has the beneficial effect of reducing the NO compounds in the exhaust. The percent of $CO_2$ in the exhaust gas stream is also increased, thereby enhancing recovery.

Recirculation of $CO_2$ can be implemented by the same devices and control systems conventionally employed for exhaust gas recirculation on motor vehicles. The recirculation of $CO_2$ can also be undertaken in conjunction with existing EGR systems. The $CO_2$ can replace all or a predetermined portion of the exhaust gas based upon the engine operating conditions or, in accordance with current practices, discontinuing recirculation entirely such as at start-up when the engine is cold, or during rapid acceleration and/or when the ICE is under a heavy load.

In a further embodiment of the invention, a portion of the $CO_2$ recovered directly from the exhaust gas stream or the densified storage container is mixed with water and catalytically reacted using known methods to form methane and water by the interim reaction of hydrogen and carbon monoxide that are formed in situ. The methane and water are then used to supplement the conventional hydrocarbon fuel supplied to the engine intake. The water reacted with the $CO_2$ can be recovered from the exhaust gas stream or from a separate on-board source provided for that purpose.

Another advantage of the method and system of the present invention is the availability of pressurized $CO_2$ on board the vehicle for use in the vehicle's air conditioning system. The $CO_2$ is used in place of man-made hydrofluorocarbon chemicals and refrigerants of the Freon type which have been shown to pose risks for harming the environment.

While the present invention has been described with reference to specific examples and the attached illustrative drawings, it will be apparent to those of ordinary skill in the art that various other modifications and changes can be made without departing from the inventive contribution, the scope of which is to be determined by the claims that follow.

The invention claimed is:

1. A method for reducing the amount of $CO_2$ discharged into the atmosphere with the exhaust gas stream emitted by an internal combustion engine (ICE) used to power a vehicle, the method comprising:
   a. circulating a $CO_2$ capture agent between an absorption zone and a regeneration zone;
   b. cooling the exhaust gas stream and contacting the cooled exhaust gas stream with the $CO_2$ capture agent in the absorption zone on board the vehicle, the capture agent having a predetermined capacity to extract $CO_2$ from the exhaust stream;
   c. discharging a treated exhaust gas stream having a reduced $CO_2$ content into the atmosphere;
   d. heating the $CO_2$ capture agent to release the extracted $CO_2$ and regenerate the capture agent;
   e. recovering an essentially pure $CO_2$ gas stream;
   f. compressing the recovered $CO_2$ gas on board the vehicle to reduce its volume; and
   g. temporarily storing the compressed $CO_2$ on board the vehicle.

2. The method of claim 1 which includes recovering heat and energy from the hot exhaust gas stream emitted by the ICE by contact with an energy conversion medium and using the energy recovered to compress the $CO_2$ in step (f).

3. The method of claim 1 which further comprises measuring the $CO_2$ level remaining in the treated exhaust gas stream and comparing the value of the measured level to a predetermined limiting value.

4. The method of claim 1 in which the $CO_2$ capture agent is heated in step (d) by heat exchange with the hot exhaust gas stream or the hot engine coolant, wherein the heat exchange occurs while the capture agent is moving.

5. The method of claim 1 in which the $CO_2$ capture agent is selected from a liquid that absorbs $CO_2$ and a finely divided flowable powdered solid material that adsorbs $CO_2$.

6. The method of claim 1 in which the $CO_2$ capture agent is a high boiling temperature liquid or eutectic mixture, a solution of an alkali metal carbonate in a high boiling temperature liquid, an ionic liquid carbonate, a high boiling temperature colloidal solution of small particles, solid particles that physically absorb $CO_2$ or react with it that are kinetically suspended in a high boiling temperature liquid, a high boiling temperature solvent that stabilizes the carbamate of a conventional amine solute, or a finely divided flowable solid adsorbent that is contacted with the exhaust gas stream in countercurrent flow relation.

7. The method of claim 1 in which a portion of the heat energy of the exhaust stream is utilized in the regeneration step (d) and the compression of step (g).

8. The method of claim 1 in which the capture agent flows continuously from an absorption zone where it contacts the exhaust gas stream and a regeneration zone where it is heated to release $CO_2$ and the capture agent is regenerated.

9. The method of claim 1 which includes recycling a portion of the $CO_2$ recovered from the exhaust gas stream to an intake manifold of the ICE.

10. The method of claim 1 in which a portion of the $CO_2$ recovered from the exhaust gas stream is utilized as a refrigerant gas in an air conditioning apparatus on board the vehicle.

11. The method of claim 2 in which at least a portion of electrical and/or mechanical energy produced by the energy conversion medium is used to power auxiliary electrical and/or mechanical systems on board the vehicle.

12. The method of claim 1 which operates substantially continuously following start-up of the vehicle.

13. The method of claim 1 which includes discontinuing the contact of the exhaust gas stream with the capture agent when the concentration of the $CO_2$ extracted by the capture agent has reached a predetermined level.

14. A system for on-board treatment of an exhaust gas stream containing $CO_2$ emitted by a hydrocarbon-fueled internal combustion engine (ICE) used to power a vehicle in order to reduce the amount of $CO_2$ discharged from the vehicle into the atmosphere, the system comprising:
   a. a treatment zone on board the vehicle containing a capture agent having a predetermined capacity for extracting $CO_2$ from the exhaust gas stream,
      the treatment zone having an inlet for admitting a stream of the capture agent and an outlet for passage of the capture agent with an increased $CO_2$ content,
      the treatment zone also including an inlet and an outlet for the exhaust gas stream and intermediate mixing means in which the exhaust gas stream contacts the capture agent,
      the treatment zone further including a heat exchanger with an inlet for receiving the hot exhaust gas stream from the ICE for passage in heat exchange relation with the capture agent to release $CO_2$ and regenerate the capture agent, and an outlet for the cooled exhaust gas stream,
      the treatment zone having a $CO_2$ discharge outlet for $CO_2$ released from the regenerated capture agent;
   b. a compression zone in fluid communication with the $CO_2$ discharge outlet from the treatment zone, the compression zone including one or more compressors for reducing the volume of the $CO_2$;
   c. a storage zone for receiving the compressed $CO_2$ for temporary storage on board the vehicle;
   d. an exhaust gas conduit in fluid communication with the treated exhaust gas stream outlet from the treatment zone; and
   e. at least one waste heat recovery zone for recovery of heat energy from the exhaust gas stream, the hot engine coolant from the ICE and/or directly from the ICE for conversion to electrical or mechanical energy.

15. The system of claim 14 which includes a diverter valve for regulating the volumetric amount of the exhaust gas stream which passes into the treatment zone before being discharged into the atmosphere.

16. The system of claim 15 in which the diverter valve is controlled based on the operating conditions of the ICE.

17. The system of claim 14 which includes control means for discharging all or a portion of the exhaust gas stream into the atmosphere without passing through the treatment zone.

18. The system of claim 14 which includes means for determining the $CO_2$ concentration of the treated exhaust gas stream as it leaves the treatment zone.

19. The system of claim 14 in which the treatment zone is comprised of at least one absorption zone and one regeneration zone with at least one valve to direct the vehicle's exhaust to at least one absorption zone.

* * * * *